US008797138B2

(12) United States Patent
Myers et al.

(10) Patent No.: US 8,797,138 B2
(45) Date of Patent: Aug. 5, 2014

(54) ONE-TIME ACCESS FOR ELECTRONIC LOCKING DEVICES

(75) Inventors: Peter Christian Myers, Beaverton, OR (US); Teri Lynné Briskey, Monmouth, OR (US); Ryan DeVore, Newberg, OR (US); Rick Dunn, King City, OR (US); Jonathan Gordon Hays, Austin, TX (US); Ali Hodroj, Beaverton, OR (US); Adam Kuenzi, Salem, OR (US); Wayne F. Larson, Salem, OR (US); James Speir, Austin, TX (US); Gregory Russell, Salem, OR (US); Kim Vertner, Molalla, OR (US)

(73) Assignee: UTC Fire & Security Americas Corporation, Inc., Bradenton, FL (US)

( * ) Notice: Subject to any disclaimer, the term of this patent is extended or adjusted under 35 U.S.C. 154(b) by 1336 days.

(21) Appl. No.: 12/352,940

(22) Filed: Jan. 13, 2009

(65) Prior Publication Data

US 2010/0176919 A1 Jul. 15, 2010

(51) Int. Cl.
*B60R 25/00* (2013.01)
*G05B 19/00* (2006.01)

(52) U.S. Cl.
USPC .......... 340/5.7; 340/5.73

(58) Field of Classification Search
USPC .......... 340/5.7, 5.73
See application file for complete search history.

(56) References Cited

U.S. PATENT DOCUMENTS 4,766,746 A * 8/1988 Henderson et al. .......... 340/5.73
4,838,052 A 6/1989 Williams et al.
4,896,246 A * 1/1990 Henderson et al. .......... 361/171
5,612,683 A 3/1997 Trempala et al.
5,654,696 A 8/1997 Barrett et al.
5,705,991 A * 1/1998 Kniffin et al. .......... 340/5.28
5,815,557 A * 9/1998 Larson .......... 340/5.64
6,038,666 A * 3/2000 Hsu et al. .......... 713/186
6,072,402 A * 6/2000 Kniffin et al. .......... 340/5.28
6,161,005 A * 12/2000 Pinzon .......... 455/403
6,192,236 B1 * 2/2001 Irvin .......... 455/420
6,472,973 B1 * 10/2002 Harold et al. .......... 340/5.73
6,570,487 B1 * 5/2003 Steeves .......... 340/5.2
6,624,742 B1 * 9/2003 Romano et al. .......... 340/5.73
6,693,538 B2 2/2004 Maloney
6,727,801 B1 4/2004 Gervasi et al.
6,989,732 B2 * 1/2006 Fisher .......... 340/3.1
7,009,489 B2 3/2006 Fischer
7,114,178 B2 * 9/2006 Dent et al. .......... 726/6
7,606,558 B2 10/2009 Despain et al.
7,701,331 B2 * 4/2010 Tran .......... 340/539.1
7,999,656 B2 * 8/2011 Fisher .......... 340/5.73
2001/0019953 A1 9/2001 Furukawa et al.
2002/0024420 A1 * 2/2002 Ayala et al. .......... 340/5.61
2002/0025804 A1 * 2/2002 Hara .......... 455/420
2002/0175809 A1 * 11/2002 Chien et al. .......... 340/425.5
2002/0180582 A1 * 12/2002 Nielsen .......... 340/5.6

(Continued)

*Primary Examiner* — Daniel Wu
*Assistant Examiner* — Kam Ma
(74) *Attorney, Agent, or Firm* — Cantor Colburn LLP

(57) ABSTRACT

Systems and methods for providing one-time access to electronic locking devices for non-keyholders. The one-time access rights are delivered from a server to the electronic locking device in real-time, or in near-real time, over short and long-range wireless communication links in a manner that is secure and traceable. A handheld device is coupled with the electronic locking device via the short-range communication link, and is coupled with the server via a long-range wireless communication link.

12 Claims, 14 Drawing Sheets

(56) References Cited

U.S. PATENT DOCUMENTS

| | | | | |
|---|---|---|---|---|
| 2003/0179075 | A1 | 9/2003 | Greenman | |
| 2003/0231102 | A1 | 12/2003 | Fisher | |
| 2004/0025039 | A1* | 2/2004 | Kuenzi et al. | 713/193 |
| 2004/0049406 | A1 | 3/2004 | Muncaster et al. | |
| 2004/0160304 | A1 | 8/2004 | Mosgrove et al. | |
| 2004/0219903 | A1* | 11/2004 | Despain et al. | 455/410 |
| 2006/0170533 | A1* | 8/2006 | Chioiu et al. | 340/5.61 |
| 2006/0259361 | A1* | 11/2006 | Barhydt et al. | 705/14 |
| 2007/0090921 | A1* | 4/2007 | Fisher | 340/5.73 |
| 2007/0096870 | A1* | 5/2007 | Fisher | 340/5.53 |
| 2007/0159297 | A1* | 7/2007 | Paulk et al. | 340/5.73 |
| 2007/0176739 | A1* | 8/2007 | Raheman | 340/5.64 |
| 2007/0241879 | A1* | 10/2007 | Jobe et al. | 340/506 |
| 2007/0245369 | A1* | 10/2007 | Thompson et al. | 725/30 |
| 2007/0290797 | A1* | 12/2007 | Harkins et al. | 340/5.73 |
| 2008/0070501 | A1* | 3/2008 | Wyld | 455/41.2 |
| 2008/0094220 | A1* | 4/2008 | Foley et al. | 340/572.4 |
| 2008/0238610 | A1* | 10/2008 | Rosenberg | 340/5.7 |
| 2008/0246587 | A1* | 10/2008 | Fisher | 340/5.73 |
| 2009/0136035 | A1* | 5/2009 | Lee | 380/270 |
| 2009/0320538 | A1* | 12/2009 | Pellaton | 70/278.1 |
| 2010/0176919 | A1* | 7/2010 | Myers et al. | 340/5.73 |
| 2010/0225441 | A1* | 9/2010 | Fisher | 340/5.73 |
| 2012/0119877 | A1* | 5/2012 | Ng et al. | 340/5.61 |

* cited by examiner

ONE-TIME ACCESS FOR ELECTRONIC LOCKING DEVICES

BACKGROUND

1. Field of the Invention

The field of the invention relates to property management generally, and more particularly to certain new and useful advances in electronic locking devices of which the following is a specification, reference being had to the drawings accompanying and forming a part of the same.

2. Discussion of Related Art

Some known access control systems used in real estate sales include electronic lockboxes that are associated with a computer network. Various methods exist for downloading key data to an electronic key and for inputting the downloaded key data to one of the electronic lockboxes. There are several disadvantages to such systems however. First, the downloaded key data can be used to access all the electronic lockboxes in the network. Second, non-keyholders cannot download the key data, and thus must directly contact an authorized user (e.g., a listing agent) to request access. For electronic lockboxes equipped with keypads, the authorized user can issue an access code to the non-keyholder, which the non-keyholder inputs into the electronic lockbox using the lockbox keypad. For electronic lockboxes without keypads, the authorized user typically has to set a time to meet the non-keyholder at the property and open the electronic lockbox for them.

Some non-keyholders are real estate agents whose Boards/Association do not have electronic lockboxes or who are keyholders in a different electronic lockbox system. Other non-keyholders are inspectors, service persons, and the like, who have legitimate, and/or time-sensitive, needs for accessing the property.

There are other ways of providing access at the entry of a real-estate listing. First, through the use of mechanical lockboxes where the combination for opening is given out and changed as needed. Second, through the use of electronic lockboxes equipped with a built-in keypad, where an agent gives out a "contractor code" or "daily code" to third party users. Third, through hiding a key somewhere on the property and disclosing its location to others as needed. Fourth, through obtaining a loaner key from a key administrator, such as a Real Estate board. None of these methods are convenient, and the security of each can be compromised.

What is needed are methods and apparatus for conveniently providing secure, traceable one-time access rights to an electronic locking device for non-keyholders without an authorized user (e.g., a listing agent or other locking device administrator) having to physically travel to the electronic locking device's location. Additionally, access events need to be logged and reported to an authorized user of the electronic locking device, and the identity of each non-keyholder needs to be authenticated.

BRIEF SUMMARY OF THE INVENTION

One or more embodiments of the invention described herein address these and/or other long-felt needs by enabling an authorized user of an electronic locking device to give one or more non-keyholders trackable, one-time access rights to the electronic locking device, in real-time, or in near-real time. For convenience and brevity, such embodiments are described as applying to real estate sales. However, embodiments of the invention apply to any field that requires electronic access control, where the potential user population is large enough that providing each user with a personal or shared key is impractical or not desired. Thus, some non-limiting examples of such fields are: real estate sales and rentals, vehicle sales and rentals, property management, and so forth.

Embodiments of the invention afford advantages over prior systems and methods. One exemplary advantage is time savings, because an authorized user of an electronic locking device is enabled, using embodiments of the invention described herein, to remotely, securely, and quickly grant a non-keyholder traceable one-time access rights to an electronic locking device without having to physically travel to the device's location. Another exemplary advantage is ability to track usage of "access events", which are instances where one-time access rights are granted and/or used. The electronic locking device is configured to record data about each access event in an access log, which is passed from the electronic locking device to a remote server via the (non-keyholder's) handheld device that requested and/or relayed a one-time access code after the remote server authenticated an identity of the non-keyholder. The term "open event" may be used interchangeably with "access event"; and the term "open event report" may be used interchangeably with "access event report".

Exemplary types of data about usage of one-time access rights that may be collected are: date/time an electronic locking device receives a one-time access code; duration of a one-time access visit; notes regarding a type and/or outcome of the one-time access visit, etc. Another exemplary advantage is that non-keyholders can obtain access to an electronic locking device with relatively few steps and with no need to purchase or borrow a dedicated wireless lockbox key. A further advantage is real-time, or near-real time, notification whenever one-time access rights are granted, edited, or revoked for one or more non-keyholders, provided an electronic locking device and/or a handheld device are within coverage of a long-range wireless communications network. A further advantage is that an authorized user of the electronic locking device is notified in real-time, near-real time, or in delayed time whenever an electronic locking device receives and/or processes a one-time access code. Another exemplary advantage is ability to restrict or prevent transfer of granted one-time access rights. Another exemplary advantage is ability to track, and/or verify, an identity of a non-keyholder who has requested and/or who has been granted one-time access rights. The identity of a non-keyholder may be authenticated and/or traced using one or more predetermined types of identifiers.

This ability to grant a non-keyholder traceable, secure, one-time access to a particular electronic locking device significantly differs from and improves over prior systems and methods. In particular, non-keyholders are granted convenient access to a particular electronic locking device, in real time or in near real time, while they are identified and an authorized user of the electronic locking device is notified of the access event.

In one embodiment, a method comprises receiving over a long-range wireless communication link a request from a handheld device for one-time access rights to an electronic locking device, wherein the request includes access information, wherein the access information comprises data from which an electronic locking device identifier can be inferred. The method further comprises authenticating an identity of a non-keyholder. The method further comprises transmitting a one-time access code over the long-range wireless communication link if the identity of the non-keyholder is authenticated. In an embodiment, the method further may further comprise receiving over the long-range wireless communication link an access log transferred from the electronic locking device to the handheld device over the short-range wireless communication link, wherein the access log comprises one or more access events. The method may also comprise notifying an authorized user of the electronic locking device of at least one of the one or more access events. The handheld device is configured to deliver the access code to the electronic locking device over a short-range wireless communication link.

In another embodiment, a system comprises a server, a handheld device, and an electronic locking device. The handheld device is configured to communicate access information to the server over a long-range wireless communication link. The electronic locking device is configured to communicate with the handheld device over a short-range wireless communication link, and is further configured to receive over the short-range wireless communication link an access code transmitted from the server to the handheld device over the long-range wireless link. The access information may comprise data from which an electronic locking device identifier can be inferred.

In another embodiment, a method of operating an electronic locking device, comprises receiving over a short-range wireless communication link an input to wake-up; validating a pairing code; and connecting over the short-range wireless communication link to a handheld device having a Hands Free Protocol ("HFP") resident thereon. The method also comprises obtaining an identifier from the handheld device; initiating a second pairing; and receiving over the short-range wireless communication link a pairing code entered into the handheld device by a non-keyholder. The method also comprises calling a remote server using the HFP of the paired handheld device and a long-range communication link that couples the handheld device and the remote server; and transmitting an access log to the remote server over the short and long-range communication links.

Other features and advantages of the disclosure will become apparent by reference to the following description taken in connection with the accompanying drawings.

BRIEF DESCRIPTION OF THE DRAWINGS

Reference is now made briefly to the accompanying drawings, in which.

Like reference characters designate identical or corresponding components and units throughout the several views, which are not to scale unless otherwise indicated.

DETAILED DESCRIPTION OF THE INVENTION

Figure 1:
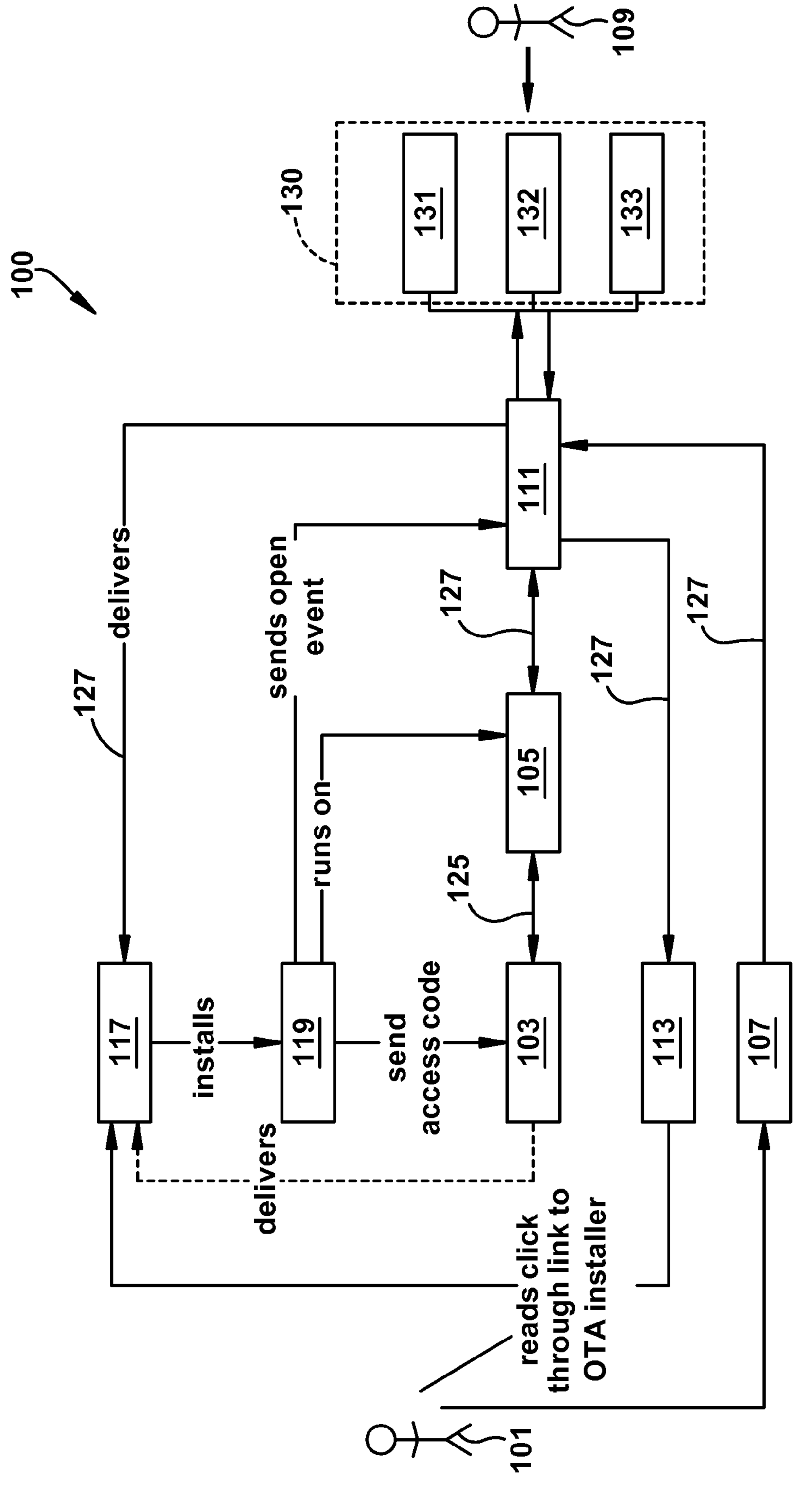
FIG. 1 is a schematic illustrating an exemplary embodiment of a system configured to permit an authorized user to grant one-time access rights to an electronic locking device for a non-keyholder.

Herein, an element or function recited in the singular and proceeded with the word "a" or "an" does not exclude a plurality of said elements or functions, unless such exclusion is explicitly recited. Furthermore, references to "one embodiment" of the claimed invention do not exclude the existence of additional embodiments that also incorporate the recited features.

The term "electronic locking device" refers to any electronic or electro-mechanical locking device that is configured (a) to prevent unauthorized access to an object and/or (b) to store one or more items for access by (i) one or more keyholders having access rights to the electronic locking device and/or (ii) one or more non-keyholders having one-time access rights to the electronic locking device.

"Keyholder" and "authorized user" are used interchangeably herein to refer to an individual authorized to open and/or manage access rights to an electronic locking device. Examples of keyholders include, but are not limited to, electronic locking device system administrators, real estate brokers, real estate listing agents, property managers, property owners, and so forth.

"Non-keyholder" and "user" are used interchangeably herein to refer to an individual who needs legitimate access to an item secured within, or by, an electronic locking device. Examples of non-keyholders include, but are not limited to, visiting real estate agents and contractors.

"Server" carries its customary meaning and further includes a corporate datacenter that provides service for interactive voice response ("IVR") and/or for data connection, e.g., to a handheld device and/or an electronic locking device.

"Handheld device" refers to a portable electronic device that is at least configured to send messages to, and/or receive messages from, a server over a long-range wireless communication network, such as a SMS, wireless, or cellular network. Examples of handheld devices include, but are not limited to: a cell phone; a personal digital assistant ("PDA"); a portable computer configured to store and playback digital pictures, songs, and/or videos; and the like. Optionally, the portable electronic device is further configured for short-range wireless communications. Examples of suitable short-range wireless communications protocols are not limited to: BLUETOOTH™ (IEEE 802.15.1), infrared, Near-Field Communication ("NFC"), Wi-Fi (IEEE 802.11, 802.111b, 802.15.3 and 802.15.3c), ZIGBEE® (IEEE 802.12.4 and 802.15.4c), etc.

At the time of this writing, BLUETOOTH™ technology satisfies the IEEE 802.15.1 standard and operates in the unlicensed industrial, scientific and medical ("ISM") band of about 1.4 GHz to 2.485 GHz, using a spread spectrum, frequency hopping, full-duplex signal at a nominal rate of 1600 hops/sec. ZIGBEE® is a high-level communication protocol based on the IEEE 802.15.4 standard, and has 27 channels ranging from 868 MHz to 2.4 GHz. It offers secure networking, a long battery life, and a low data rate.

Infrared ("IR") data transmission is also used for short-range wireless communication among electronic devices, and usually conforms to standards published by the Infrared Data Association ("IrDA"). Typically, infrared light emitting diodes are operated to emit infrared radiation, which a lens focuses into a narrow beam that is modulated to encode data. An infrared receiver, e.g., a photodiode, receives the emitted infrared radiation and converts it to an electric current, which is then routed through various electrical components of a device associated with the infrared receiver.

NFC refers to a short-range (less than @ 20 cm) communication protocol over a 13 Mhz signal, and is similar and related to the International Organization for Standardization ("ISO") standards for smartcards.

The term "one-time access" carries its plain ordinary meaning, and further encompasses (i) any number of accesses within a predetermined time period, (ii) a predetermined number N of accesses, where N=2 or more, and (ii) a predetermined number N of accesses within a predetermined time period.

"One-time access rights" comprise one or more types of data that permit a non-keyholder to access, or unlock, an electronic locking device. Examples of the one or more types of data comprising "one-time access rights" include, but are not limited to: authentication codes, access codes, non-keyholder permissions, non-keyholder credentials, and the like.

The term, "remote agent," refers to a monitoring company, a cellular phone, a personal data assistant or other handheld device, a personal computer, a desktop computer, a server computer, a laptop computer, a control panel, a multiprocessor system, a microprocessor-based system, a set top box, a programmable consumer electronic, a network PC, a minicomputer, a mainframe computer, and/or distributed computing environments that include any of the above systems or devices, and the like.

FIG. 1 is a schematic illustrating an exemplary embodiment of a system 100 configured to permit an authorized user 109 to grant one-time access rights to a non-keyholder 101 for a particular electronic locking device 103. In the exemplary embodiment, the system 100 comprises at least the electronic locking device 103, a server 111, and one or more user interfaces 130 and software applications 117, 119. Optionally, the system 100 also comprises a non-keyholder's handheld device 105 ("handheld device 105") and/or a handheld device (not shown) or other type of computer of the authorized user 109. The user interfaces 130 include, in one embodiment, a mobile application 131 configured to run on a handheld device of an authorized user 109; a website 132 configured to be accessed by the authorized user 109; and an IVR system 133. The authorized user 109 may access any of the mobile application 131, the website 132, and the IVR system 133 using a handheld device (not shown) or other type of computer.

In the exemplary embodiment, the server 111 hosts a first software application 117, which is an over-the-air ("OTA") installer program that is configured to install a second software application 119, a one-time electronic key program, on the handheld device 105. Alternatively, the electronic locking device 103 hosts the first software application 117, e.g., the OTA installer program. The server 111 is a data server and/or an IVR server that operates the Individual Voice Response ("IVR") system interface 133.

In the exemplary embodiment, a short-range wireless communication link 125 communicatively couples the handheld device 105 and the electronic locking device 103. One or more long-range wireless communication links 127 couple the server 111 with the handheld device 105 and/or to the electronic locking device 103. In FIG. 1, reference numeral 107 represents a request message for one-time access rights that is sent by the handheld device 105. Reference numeral 113 represents a message containing one-time access rights, e.g., a one-time access code and/or permissions or other data associated therewith, that is sent from the server 111.

Figure 2:
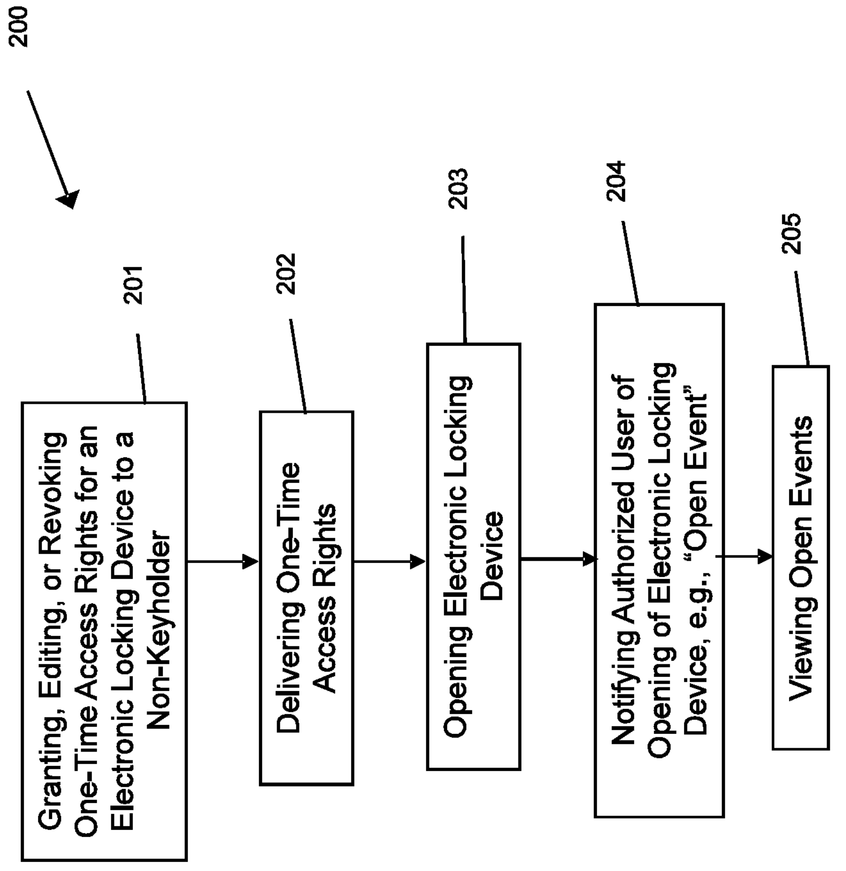
FIG. 2 is a flowchart of a simplified method of operating an embodiment of the system of FIG. 1.

FIG. 2 is a flowchart 200, having blocks 201, 202, 203, 204, and 205, that summarizes an overall operation of an embodiment of the system 100. Referring to FIGS. 1 and 2, at block 201, an authorized user 109 grants, edits, or revokes, one-time access rights to a non-keyholder 101 for one or more electronic locking devices 103. At block 202, a server 111 then delivers the granted, modified, or revoked one-time access rights. In one embodiment, these access rights are created or modified based on access information input to the server 111 by the authorized user 109. As further explained below, the access information may comprise a handheld identifier, a password/PIN code, Caller ID information, an electronic locking device identifier, and/or date/time information. In one embodiment, the electronic locking device identifier is inferred from one or more of: a street address of a property at which the electronic locking device 103 is located; a property location identifier, a real estate listing identifier, a GPS coordinate of, or proximate, the property at which the electronic locking device 103 is located, etc. Optionally, at block 202, the server 111 may authenticate an identity of the non-keyholder 101.

At block 203, the non-keyholder 101 uses the granted or modified one-time access rights to open the electronic locking device 103. At block 204, the server 111 notifies the authorized user of an "access event". At block 205, the authorized user 109 views a report listing all access events for the one or more electronic devices 103 managed and/or owned by the authorized user 109.

Figure 3:
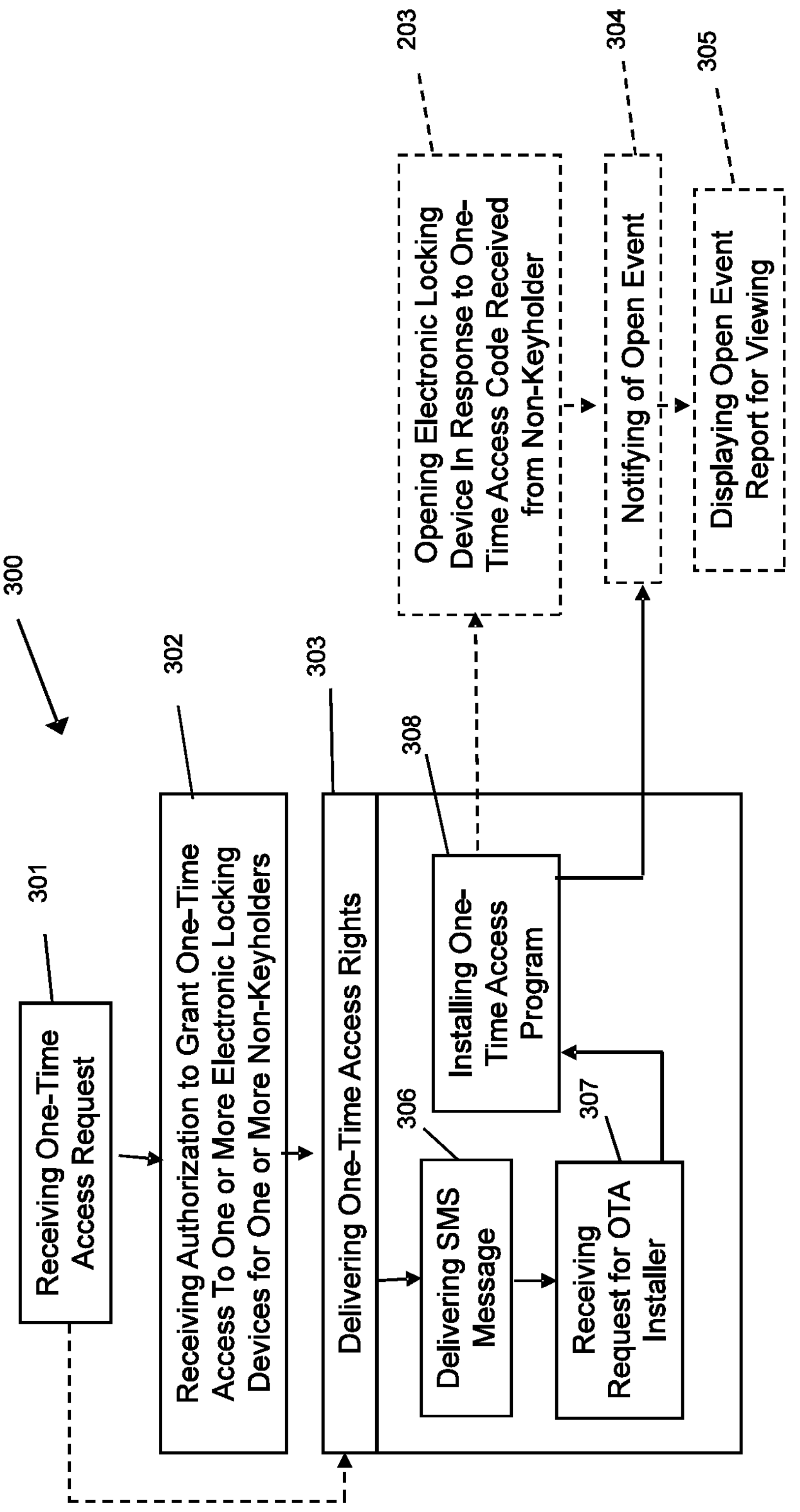
FIGS. 3-8 are flowcharts of embodiments of methods used to provide one-time access rights to a non-keyholder.

FIG. 3 is a flowchart of an embodiment of a method 300 of granting one-time access rights for an electronic locking device to a non-keyholder. Referring to FIGS. 1 and 3, the method 300 may begin by receiving 301 from a non-keyholder 101 a request for one-time access rights to an electronic locking device 103. In one embodiment, the request is a first message 107 transmitted from the handheld device 105 and received by the server 111 and/or the authorized user 109. In one embodiment, the first message 107 contains at least a request for one-time access, and may be a SMS message. In one embodiment, the request for one-time access includes an electronic locking device identifier and/or an identifier that can be used to authenticate the identity of the non-keyholder 101. As further explained below, the identifier may be a telephone number, a contractor license number, a government issued identification number, and so forth.

The method 300 further comprises receiving 302 authorization to grant the requested one-time access rights. The authorized user 109 may receive notification of, and/or view, the first message 107 via at least one of the interfaces 130, e.g., mobile application 131, website 132, and IVR system 133. In any event, the system 100 enables the authorized user 109 to grant, edit, or revoke, one-time access rights to the non-keyholder 101 using at least one of the interfaces 130. Depending on the embodiment, the authorized user's grant of authorization may occur in real-time, in near-real time, or on a delayed time.

Alternatively, the authorized user 109 may pre-authorize a non-keyholder to receive one-time access rights to an electronic locking device 103, in which case, the server 111 and/or the electronic lockbox 103 are/is configured to automatically grant the one-time access rights upon request by the non-keyholder 101. In such an embodiment, the method 300 would proceed directly from block 301 to block 303.

As used herein, "pre-authorize" means that a one-time access code having a predetermined expiration time/date is, or can be, provided to a non-keyholder 101 in advance of the non-keyholder 101 requesting access to the electronic lockbox 103. Receipt of the one-time access code by the electronic lockbox 103 and/or by the server 111 and/or by the handheld device 105, at the time access to the electronic lockbox 103 is desired, causes the electronic lockbox 103 to open. The one-time access code can be paired with identity data, e.g., data about the identity of a particular non-keyholder such as an identifier or PIN code, and/or with permissions data, e.g., data that configures an electronic locking device 103 to grant one-time access to the non-keyholder.

Such permission data may include, but are not limited to, date(s)/time(s) of entry, number of entries permitted within a predetermined time window, information about an identity of the non-keyholder, and the like. In this pre-authorization embodiment, the one-time access code, the identity data and/or the permissions data may be stored on the same or different server 111 and/or on a computer-readable memory of the electronic locking device 103.

Alternatively, "pre-authorizing" means a generic one-time access code is provided, which can be customized for a non-keyholder, by pairing the generic one-time access code with an identifier and/or a PIN code that uniquely identifies an identity and/or role of the non-keyholder.

Referring again to FIG. 3, the method 300 further comprises delivering 303 the one-time access rights. In an embodiment, this step is performed by the server 111 and may further comprise delivering 306 a second message 113 back to the non-keyholder 101, e.g., to the handheld device 105. The second message may include at least a one-time access code, and may be a SMS message. The non-keyholder 101 views the second message 113 received from the server 111 and clicks, or otherwise activates, a web link to the first software program 117, which, as previously mentioned, may be an over-the-air ("OTA") installer. Clicking the web link causes the server 111 to link the first software program 117 to the handheld device 105 over a long-range communications link, or network. Thus, this step 303 may further comprise receiving 307 a request for an first software program 117. The step 303 may further comprise installing 308 the one-time access program 119 onto the handheld device 105. Once installed, the one-time access program 119 runs on the handheld device and configures the handheld device 105 to transmit a one-time access code, using a short-range wireless communication link 125, to the electronic locking device 103.

Thereafter, the method 300 may comprise opening 203 the electronic locking device 103 in response to a one-time access code received from the non-keyholder 101. Opening 203 the electronic locking device includes opening a shackle of the electronic locking device 103, opening a compartment of the electronic locking device 103, and/or configuring a lock or latch to grant access to an object. Depending on network coverage, the method 300 optionally comprises notifying 304 the authorized user 109 of the access event and/or displaying 305 an access event report for viewing by the authorized user 109.

The description of the method of FIG. 3 describes one or more steps that may be performed by a computer processor. In an alternative embodiment, a non-keyholder 101, who desires access to an electronic locking device, may contact the authorized user 109 directly via telephone or other means, and provide identity information that the authorized user 109 uses to query the server 111 to determine whether the non-keyholder 101 has pre-registered. This occurs in one embodiment by querying the server 111. If the non-keyholder 101 has pre-registered, the authorized user 109 can ask the non-keyholder 101 to further verify his/her identity by providing a pre-registered password or PIN.

In another embodiment, a pre-registered non-keyholder 101, who desires access to an electronic locking device, may contact the authorized user 109 directly via telephone or other means, and provide a handheld identifier that the authorized user 109 uses to query the server 111 to determine a one-time access code. The authorized user 109 can optionally ask the pre-registered non-keyholder 101 to further verify his/her identity by providing a pre-registered password or PIN code. Alternatively, a pre-registered non-keyholder 101 can include the handheld identifier and/or password/PIN code in the message 107 (FIG. 1) that requests access from the server 111.

Figure 4:
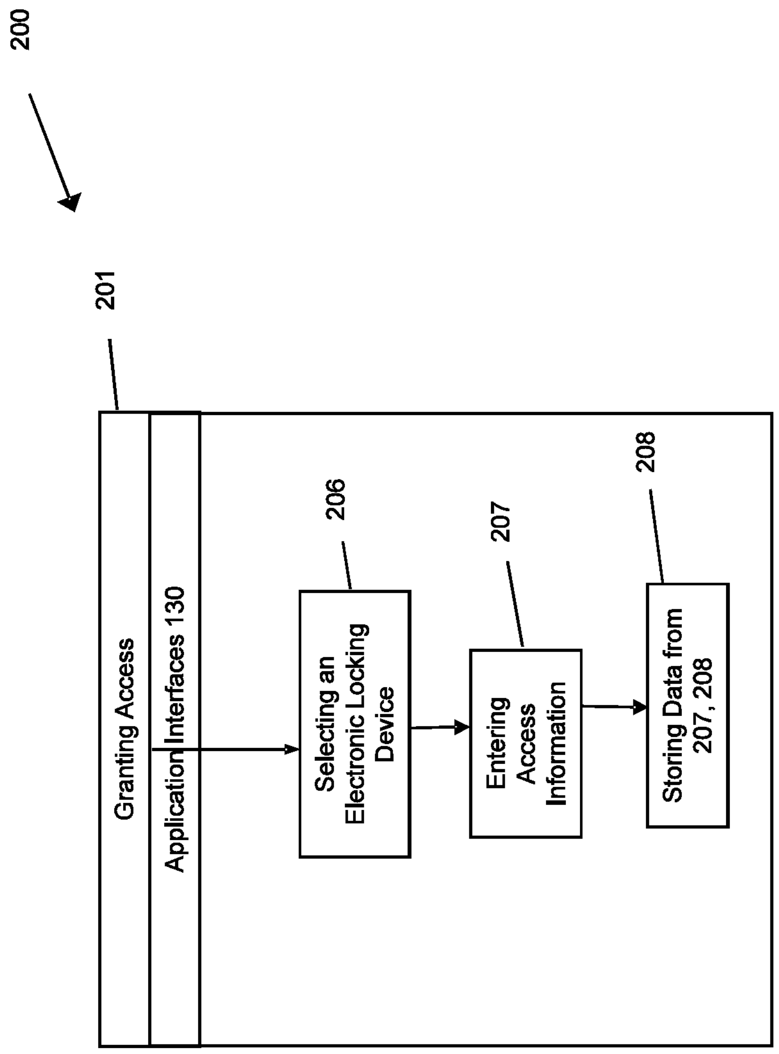

Various embodiments of additional methods of operating embodiments of the system 100 are now described with reference to FIGS. 4-8. FIG. 4 is a flowchart illustrating additional steps that may comprise the step 201 of method 200 in FIG. 2. For example, referring to FIGS. 1, 2 and 4, the step 201 further comprises selecting 206 an electronic locking device 103; entering 207 access information; and storing 208 data about the selected electronic locking device 103 and entered access information 207. In one embodiment, the electronic locking device 103 is selected/identified by an identifier, e.g., numerical, alphabetical, or alphanumerical code uniquely assigned to the electronic locking device. If the electronic locking device 103 is a real estate lockbox, the identifier can be the address of the property. Alternatively, the electronic locking device identifier may be visually read by the non-keyholder 101 and transmitted as part of the request for one-time access rights. Alternatively, the electronic locking device identifier may be transmitted from the electronic locking device 103 to the handheld device 105 and thereafter included in the request for one-time access rights. Alternatively, the electronic locking device identifier can be inferred from other data, as mentioned above.

In an embodiment, the server 111 contains a lookup table containing adjacent columns, which are configured to store one or more types of access information, such as, but not limited to: property addresses, corresponding locking device identifiers, corresponding one-time access codes, identity information of pre-registered non-keyholders, password and/or PIN code of pre-registered non-keyholders, identity information of authorized users, password and/or PIN code of authorized users, GPS coordinates of the property/object, real estate listing identifier, and so forth.

Figure 5:
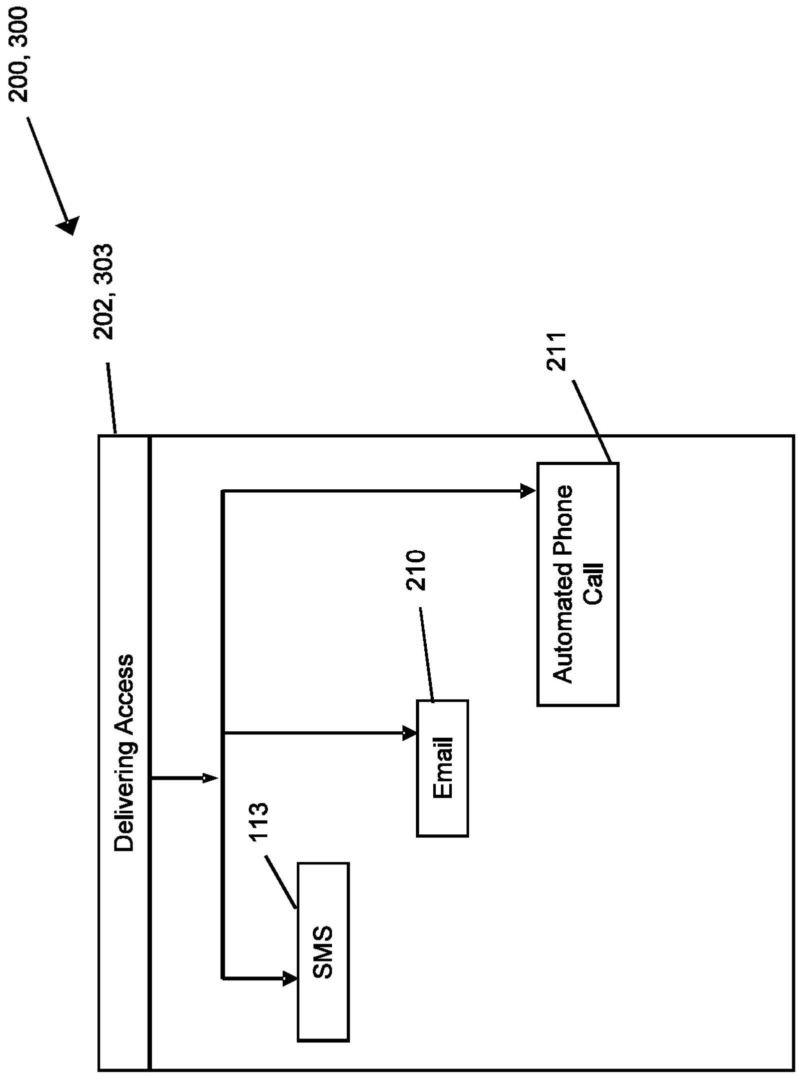

FIG. 5 is a flowchart illustrating additional steps that may comprise the step 202 of method 200 in FIG. 2 and the step 303 in method 300 of FIG. 3. For example, referring to FIGS. 1, 2, 3 and 5, the step 202, 303 further comprises delivering the one-time access rights via a second (SMS) message 113, via an email message 210, and/or via an automated phone call 211. Depending on how the non-keyholder 101 actually accesses the electronic locking device 103, the one-time access code and/or access credential may or may not be included in the message 113, 210, and/or 211.

Figure 6:
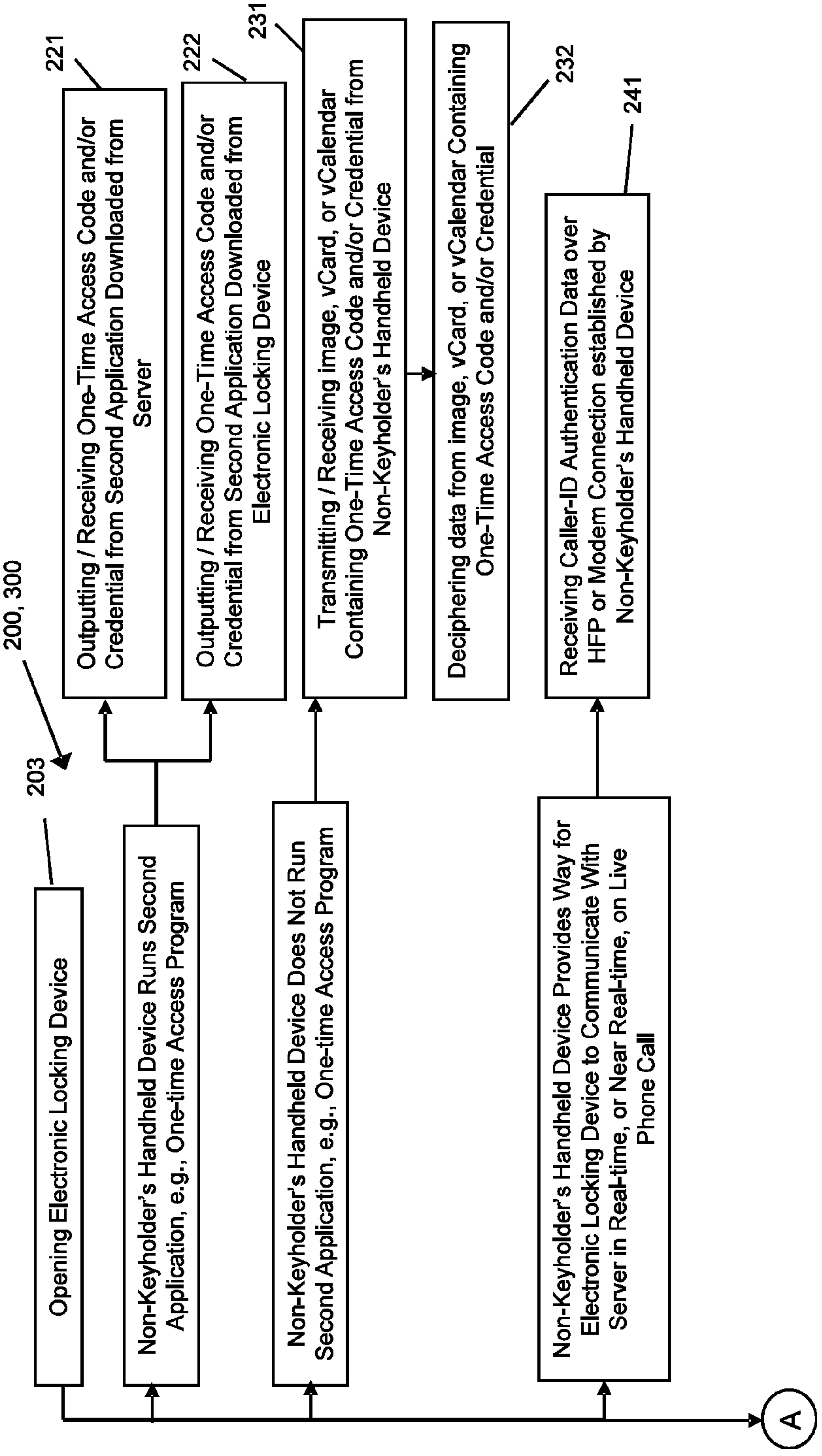
Figure 7:
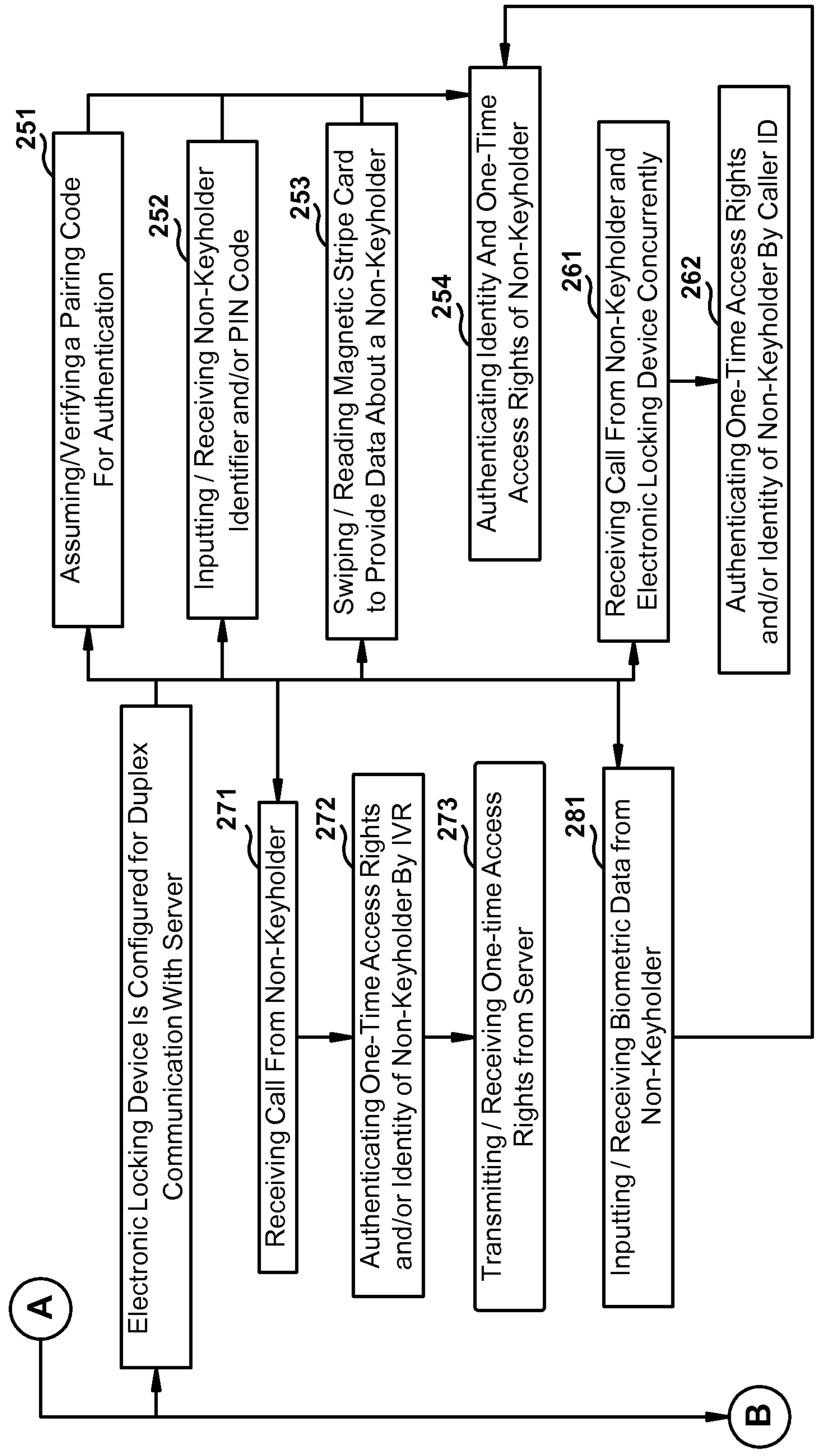
Figure 8:
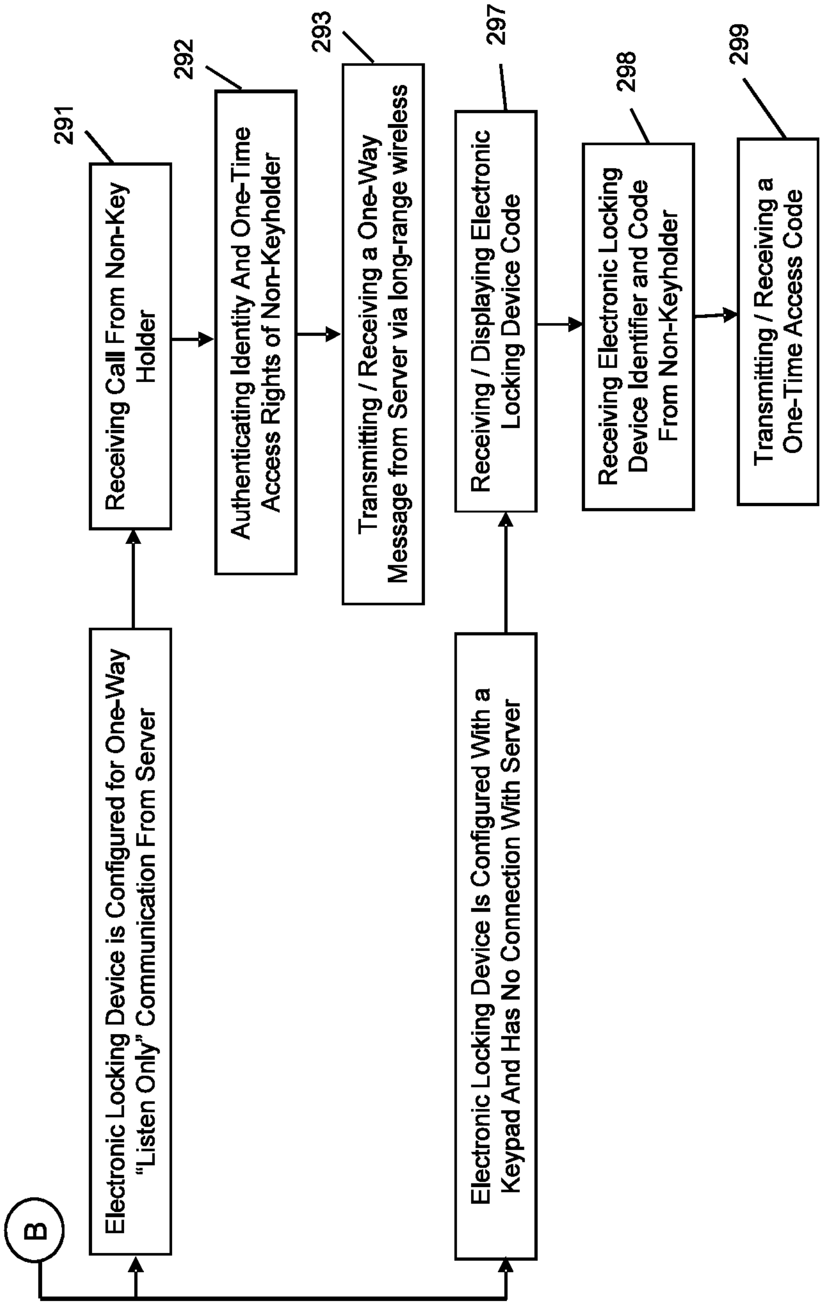

FIGS. 6-8 are flowcharts illustrating additional steps that may comprise the step 203 of methods 200 and 300 of FIGS. 2 and 3, respectively. Referring now to FIGS. 1, 2, 3, and 6-8, step 203 may comprise one or more of steps 221, 222, 231, 232, 241, 251, 252, 253, 254, 261, 262, 271, 272, 273, 281, 291, 292, 293, 297, 298, and 299, depending on how the electronic locking device 103 and/or the handheld device 105 is/are configured. The following description of FIGS. 6-8 uses terms such as "outputting/receiving," and similar terms, to simplify the drawings and to provide support for claims written from the perspective of the server 111, the electronic locking device 103, and/or the handheld device 105.

Referring to FIGS. 1, 2, 3, and 6, in an embodiment where the handheld device 105 is configured to run the second software application 119, e.g., the one-time access program, the step 203 may further comprise outputting/receiving 221 a one-time access code and/or credential from the one-time access program 119 that is downloaded from the server 111. Alternatively, the step 203 may further comprise outputting/receiving 222 a one-time access code and/or credential from the one-time access program 119 that is downloaded from the electronic locking device 103. In steps 221 and 222, the term "outputting" refers to actions performed by the handheld device 105, while the term "receiving" refers to actions performed by the electronic locking device 103. In this embodiment, there is no live phone call and the handheld device 105 provides one-time access rights regardless of whether it is in or out of long-range wireless coverage. Additionally, in this embodiment, the electronic locking device and the handheld device 105 are configured to communicate over a short-range wireless communication link 125.

The handheld device 105 is also configured for situations where the electronic locking device 103 is located out of range of long-range wireless coverage. In particular, the handheld device 105 is configured to receive an access log from the electronic locking device 103 over the short-range communication link 125, and to send the access log to a remote server 111 when the handheld device 105 is within long-range wireless coverage.

Referring again to FIGS. 1, 2, 3, and 6, in an embodiment where the handheld device does not run the second software application 119, e.g., the one-time access program, the step 203 may further comprise transmitting/receiving 231 an image, a vCard, or a vCalendar containing a one-time access code and/or credential from the handheld device 105. Alternatively, the image, vCard, or vCalendar contains data from which a one-time access code and/or credential can be generated and/or deciphered for authentication purposes. If so, the step 203 may further comprise deciphering 232 the data from the image, vCard, or vCalendar into a form that can be used to authenticate an identity of the non-keyholder 101 and/or grant one-time access rights. In step 231, "transmitting" refers to actions performed by the handheld device 105. In steps 231 and 232, "receiving" and "deciphering" refer to actions performed by the electronic locking device 103. In this embodiment, the electronic locking device 103 and the handheld device 105 are each configured to communicate over the short-range wireless communication link 125. In this embodiment, a calendar application resident on the handheld device 105 is used to "beam" the one-time access rights to the electronic locking device 103 over short-range wireless communication link, or network, 125 using known Object Exchange (OBEX) protocols.

Referring to FIGS. 1, 2, 3, and 6, in an embodiment where the handheld device provides a way for the electronic locking device 103 to communicate with the server 111 in real-time, or in near-real time, via a live phone call, the step 203 may further comprise receiving 241 caller-ID authentication data over a voice connection or a modem connection established by the handheld device 105. In step 241, "receiving" refers to an action performed by the server 111. In this embodiment, the electronic locking device and the handheld device 105 are configured to communicate over the short-range wireless communication link 125, which is a BLUETOOTH™ connection between the electronic locking device 103 and the handheld device 105. The electronic locking device 103 is configured to use a Hands-Free Profile ("HFP") protocol, resident on the handheld device 105, to establish a phone call to the server 111. After the phone call has been established, the electronic locking device 103 uses duplex modem signals to communicate with the server 111; and the server 111, which may authenticate an identity of the non-keyholder 101, sends the access code to the electronic locking device 103 via the handheld device 105 using the HFP protocol. An advantage of this embodiment is that no special application on the handheld device 105 is required, except that it needs to be configured to support BLUETOOTH™ and HFP.

Referring to FIGS. 1, 2, 3, and 7, in an embodiment where the electronic locking device 103 is configured for two-way, e.g., duplex, communication with the server 111, the step 203 may further comprise obtaining/validating 251 a BLUETOOTH™ pairing code for authentication during the BLUETOOTH™ pairing process. In step 251, "obtaining" refers to an action performed by the electronic locking device 105 or the server 111; and the step "validating" refers to an action performed by the electronic locking device 103. Thereafter, the step 203 may further comprise authenticating 254 an identity and/or one-time access rights of the non-keyholder 101. In step 254, "authenticating" refers to an action performed by the electronic locking device 103 and/or by the server 111.

Alternatively, the step 203 may further comprise inputting/receiving 252 a non-keyholder identifier and/or PIN code. In step 252, "inputting" refers to an action performed by the non-keyholder 101, and "receiving" refers to an action performed by at least one of the electronic locking device 103, the handheld device 105, and/or the server 111. For example, the non-keyholder 101 may manually enter the identifier and/or PIN code using a keypad on the electronic locking device 103. Alternatively, the non-keyholder 101 may manually enter the identifier and/or PIN code using a keypad on the handheld device 105. Alternatively, the non-keyholder 101 may speak the identifier and/or PIN code into a microphone of the electronic locking device 103. Alternatively, the non-keyholder 101 may speak the identifier and/or PIN code into a microphone of the handheld device 105. Thereafter, the step 203 further comprises authenticating 254 an identity and/or one-time access rights of the non-keyholder 101. In one embodiment, the electronic locking device 103 performs the authentication by (i) establishing a live communication with the server 111 or (ii) using identifier and/or PIN code data previously downloaded from the server 111. In another embodiment, the server 111 performs the authentication.

Alternatively, the step 203 may further comprise swiping/reading 253 a magnetic stripe card to provide data about a non-keyholder. In this embodiment, the magnetic stripe card is any such card containing information that enables tracking and/or verification of the identity of the non-keyholder 101 that is requesting one-time access rights. In this embodiment, the electronic locking device 103 is configured with a magnetic stripe card reader and requisite software. "Swiping" refers to an action performed by the non-keyholder 101. "Reading" refers to one or more actions performed by the electronic locking device 103. Thereafter, the step 203 further comprises authenticating 254 an identity and/or one-time access rights of the non-keyholder 101.

Alternatively, the step 203 may further comprise receiving 261 a call from the non-keyholder 101 and the electronic locking device 103 concurrently. The step 203 may further comprise authenticating 262 an identity and/or one-time access rights of the non-keyholder 101 by caller-ID information. In steps 261 and 262, "receiving" and "authenticating" each refer to one or more actions performed by server 111, which may be an IVR server. Once the server 111 has authenticated the non-keyholder's identity, it sends the access code to the handheld device 105 and/or to the electronic locking device 103.

Alternatively, the step 203 may further comprise receiving 271 a call from the non-keyholder 101; authenticating 272 an identity and/or one-time access rights of the non-keyholder 101 by IVR; and transmitting/receiving 273 one-time access rights from the server 111. In this embodiment, "receiving a call", "authenticating", and "transmitting" each refer to one or more actions performed by the server 111. "Receiving one-time access rights" refers to one or more actions performed by the electronic locking device 103 and/or the handheld device 105.

Alternatively, the step 203 may further comprise inputting/receiving 281 biometric data from a non-keyholder 101; and authenticating 254 an identity and/or one-time access rights of the non-keyholder 101, using the inputted/received biometric data. In this embodiment, the electronic locking device 103 is configured with one or more biometric sensors and associated software. Examples of biometric sensors include, but are not limited to: a fingerprint scanner, a voice scanner, a retinal scanner, and so forth. In such an embodiment, the electronic locking device 103 is configured to communicate with the server 111 to authenticate the biometric information.

The embodiment described immediately prior with respect to FIGS. 1, 2, 3, and 7 can be varied. For example, an electronic locking device 103 equipped with code generation software, can generate its own first pairing code, for example, a BLUETOOTH™ pairing code, and a second pairing code using code-generation software. The second pairing code is used to validate a secret pairing code that a non-keyholder enters into the handheld device 105. Alternatively, if within long-range wireless coverage, the electronic locking device 103 may obtain the first and/or second pairing codes from a remote server. Thus, depending on the embodiment, the code-generation software runs on the server 111 or is executed by a processor in the electronic locking device 103 or in the handheld device 105. The code-generation software is configured to generate the second pairing code based on one or more of the following: electronic locking device identifier, non-keyholder identifier, an electronic locking device secret electronic or digital key, and a date/time for which the one-time access code is to be valid. In one embodiment, the code-generation software generates a second pairing code that changes daily. In other embodiments, the secret pairing code and an identifier of the handheld device 105 are transmitted from the handheld device 105 to the electronic locking device 103 over the short-range wireless communication link 125. Thereafter, the electronic locking device 103 validates the secret pairing code using the identifier of the handheld device 105.

To initiate a first pairing operation, the electronic locking device 103 obtains (e.g., receives from the remote server or self-generates) the first pairing code. The electronic locking device 103 then connects, over the short-range wireless link 125, to the handheld device 105 having a Hands Free Protocol ("HFP") resident thereon. The electronic locking device 103 then validates the first pairing code. This validation may be performed using any suitable validation protocol. Afterwards, the electronic locking device 103 receives an identifier from the handheld device 105. For example, the identifier may be a phone number of the handheld device 105. The electronic locking device 103 then obtains a second pairing code and thereafter initiates a second pairing operation. After initiating the second pairing operation, the electronic locking device 103 validates, over the short-range wireless link, the second pairing code with a secret pairing code entered into the handheld device 105 by a non-keyholder. If this validation succeeds, the electronic locking device calls the remote server using the HFP of the paired handheld device 105 and a long-range communication link 127 that couples the handheld device 105 and the remote server 111. Thereafter, the electronic locking device 103 transmits an access log to the remote server over the short-range communication link and the long-range communication link. An advantage of using secret pairing codes is that each secret pairing code is unique to each handheld device 105 and cannot be transferred to other handheld devices. Before or after the first pairing operation is initiated, a non-keyholder 101 uses the handheld device 105 to request one-time access from a remote server. In response, the remote server 111 obtains an identifier from the handheld device 105, which is used to generate the secret pairing code. The remote server 111 then transmits the secret pairing code, together with a default pairing code, back to the handheld device 105 via an electronic message, such as an SMS message for example. The default pairing code is used to validate the first pairing code obtained by the electronic locking device 103.

In an embodiment, once the handheld device 105 links the electronic locking device 103 using the short-range wireless communication link 125, the electronic locking device can use the HFP (if the handheld device 105 supports it) to request a handheld identifier (e.g., telephone number, or other type of identifier) from the handheld device 105 and save the received handheld identifier as part of the access log, which is stored in a memory of the electronic locking device 103. To further verify an identity of the non-keyholder 101 operating the handheld device 105, the electronic locking device 103 can request the non-keyholder 101 to input a password or PIN code. Depending on the embodiment, the password or PIN code can be input to the handheld device 105 using a microphone and/or an input device on the handheld device 105 and relayed over the short-range wireless communication link 125 to the electronic locking device 103; or can be input directly to the electronic locking device 103 using a microphone and/or an input device on the electronic locking device 103.

In an embodiment, once the handheld device 105 links the electronic locking device 103 using the short-range wireless communication link 125, the electronic locking device can use the HFP (if the handheld device 105 supports it) to send access log data to the server 111.

In another embodiment, once the handheld device 105 links the electronic locking device 103 using the short-range wireless communication link 125, the electronic locking device can use the HFP (if the handheld device 105 supports it) to receive audio (e.g., dual-tone, multi-frequency) tones from the IVR server. The electronic locking device 103 may be further configured to decode the received audio tones and to unlock if the decoded audio tones are authorized.

Figure 9:
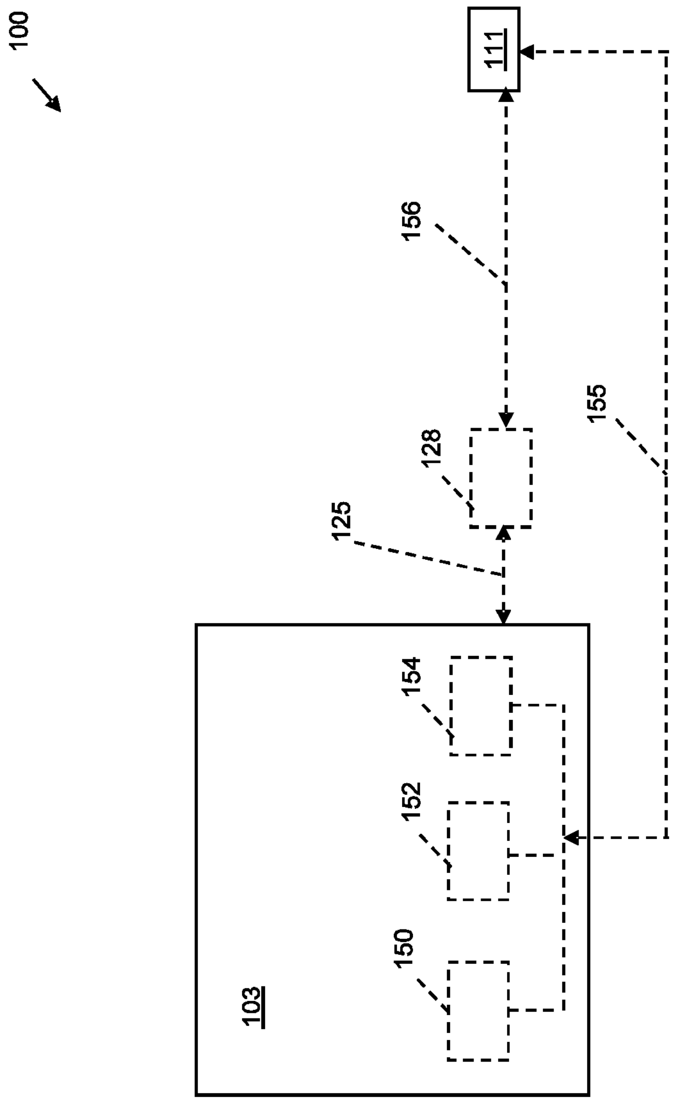
FIG. 9 is a block diagram of an embodiment of an electronic locking device.

Referring now to FIGS. 1, 2, 3, and 8, in an embodiment where the electronic locking device 103 is configured for one-way "Listen Only" communication from the server 111, the step 203 may further comprise receiving 291 a call from the non-keyholder 101; authenticating 292 an identity and/or one-time access rights of the non-keyholder 101; and transmitting/receiving 293 a one-way message from the server 111 via a long-range wireless communication channel (155 in FIG. 9). For example, in one embodiment, if the electronic locking device 103 receives its own secure identification code in the one-way message, it opens. In steps 291, 292, and 293, "receiving a call", "authenticating", and "transmitting" each refer to one or more actions performed by the server 111. In step 293, "receiving a one way message" refers to one or more actions performed by the electronic locking device 103. The one-way message may include the one-time access rights of the non-keyholder 101. Examples of a long-range wireless communication channel include, but are not limited to: FM, satellite, pager, sideband, or other long-range wireless link. Other types of communication channels that may be utilized by the electronic locking device 103, the handheld device 105, and/or the server 111 are described elsewhere in this document.

In an embodiment where the electronic locking device 103 is configured with a keypad and has no long-range wireless connection with the server 111, the step 203 may further comprise receiving/displaying 297 an electronic locking device code. In step 297, "receiving" refers to one or more actions performed by the non-keyholder 101, and "displaying" refers to one or more actions performed by the electronic locking device 103. The step 203 may further comprise receiving 298 the electronic locking device identifier and code from the non-keyholder 101. In step 298, "receiving the electronic locking device identifier and code" refers to one or more actions performed by the server 111. The step 203 may further comprise transmitting/receiving 299 a one-time access code for the non-keyholder 101. In step 299, "transmitting a one-time access code" refers to one or more actions performed by the server 111; and "receiving a one-time access code" refers to one or more actions performed by the electronic locking device 103. Thereafter, the step 203 may further comprise authenticating the identification and/or one-time access rights of the non-keyholder 101.

An advantage of identifying the non-keyholder 101 and using a displayed code on the electronic locking device 103 is that the access event can be linked to that particular non-keyholder. This contrasts with a known electronic locking device that has only a keypad and no other means of identifying the person using the keypad, in which case an access code could be shared with other persons and the electronic locking device would have no way of differentiating among them. Thus, the displayed code provided by an embodiment of the invention provides a "challenge/response" mechanism that requires a near-real time transaction to occur in order to get the access code. When the remote server 111 later provides the access code, it means that the remote server 111 has authenticated an identity of the non-keyholder 101 via a phone call.

Figure 10:
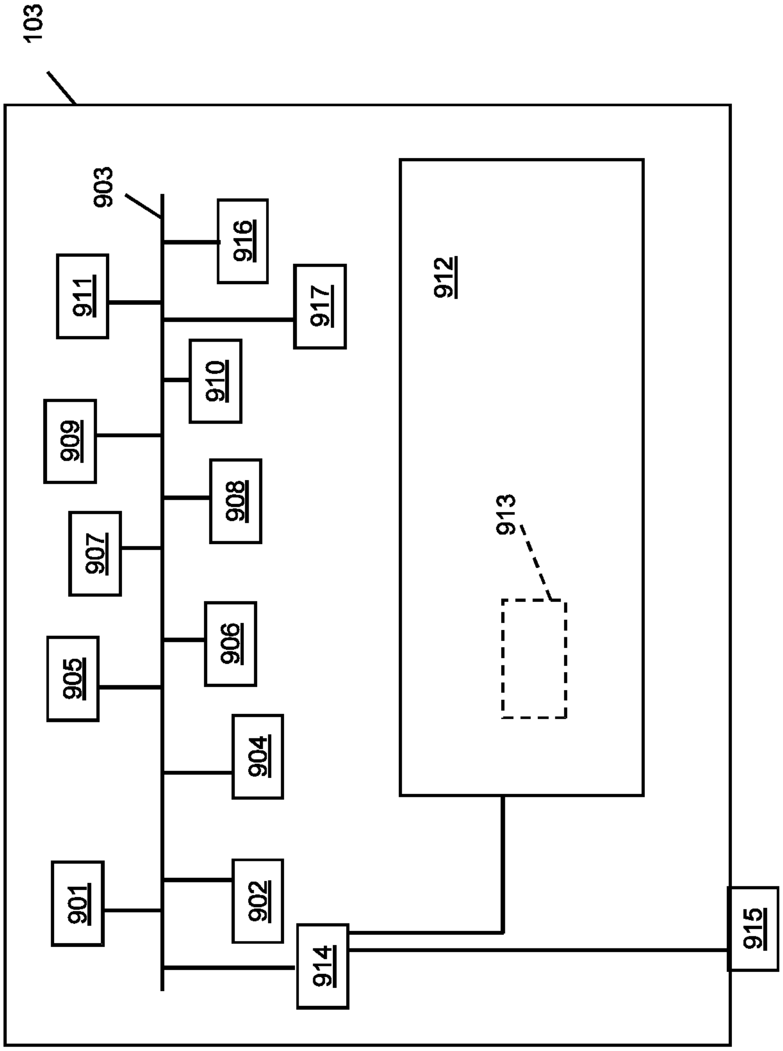
FIG. 10 is block diagram of another embodiment of the electronic locking device.

FIG. 9 is a block diagram illustrating another embodiment of the system 100 of FIG. 1. In FIGS. 9 and 10, alternative or optional components are indicated in dashed lines. Some of the embodiments described above with respect to FIGS. 6 and 8 permit an electronic locking device 103 to communicate with the server 111 without using a handheld device 105. As shown in FIG. 9, the electronic locking device 103 in such embodiments may comprise at least one of an internal cellular modem 150, a wireless fidelity ("Wi-Fi") transceiver 152 for connection to a wireless LAN, a satellite receiver 154, e.g., a satellite radio receiver or other satellite downlink network receiver, or an external dialer 128. Each of the internal cellular modem 150, the Wi-Fi transceiver 152, and the satellite receiver 154 establishes its own particular type of wired or long-range wireless communication link 155 with the server 111. In an embodiment where an external dialer 128 is used, the electronic locking device 103 may use any type of short-range wireless communication link 125, to link with the external dialer 128, which may be located within a building. The external dialer 128 establishes a wired or long-range wireless communication link 156 with the server 111. In such embodiments, the electronic locking device 103 may be configured to "sleep" in a power conservation mode until "woken up" by a non-keyholder. Upon "waking up", the electronic locking device 103 opens a communication channel, 155 or 125 and 156, and communicates with the server 111 to determine whether the non-keyholder 101 is permitted to open the electronic locking device 103.

FIG. 10 is a block diagram of an embodiment of an electronic locking device 103. The exemplary embodiment of the electronic locking device 103 comprises a computer processor 901 linked to a computer-readable memory 902 via a power/data bus 903. Depending on the embodiment, the power/data bus 903 may further link the computer processor with one or more of the following components: an antenna 904 configured for short-range wireless communications, an antenna 905 configured for long range wireless communications, a biometric sensor 906, a keypad 907, a display 908, a signal modulator 909 configured to generate short-range and/or long range wireless messages, a power source 910, a magnetic stripe card reader 911, a receptacle 912 configured to house an item 913; and an electronic controller 914 configured lock/unlock the receptacle 912 and/or a shackle 915 of the electronic locking device, which secures the electronic locking device to a door or other object; and a microphone 916 and speaker 917. The item 913 is anything that will fit within the receptacle 912, but in one particular embodiment is a lock key. Other embodiments of an electronic locking device 103 may omit some features, such as, but not limited to, the microphone 916 and speaker 917.

Thus, referring to FIGS. 1-9, one embodiment of the invention provides an electronic locking device 103 having a computer processor 901 configured to process one-time access rights for a non-keyholder 101 from one of a server 111 and the handheld device 105.

Another embodiment of the invention provides an electronic locking device 103 having a computer processor 901 configured to receive an identifier and/or a PIN code from a non-keyholder, wherein the computer processor 901 is further configured to authenticate the identifier and/or PIN code and to grant or deny one-time access rights to the non-keyholder 101.

An embodiment of the invention also provides a system 100 having an electronic locking device 103 having a computer processor 901 configured to process one-time access rights for a non-keyholder 101 from one of a server 111 and the handheld device 105.

An embodiment of the invention also provides a system 100 having an electronic locking device 103 having a computer processor 901 configured to receive an identifier and/or a PIN code from a non-keyholder, wherein the computer processor 901 is further configured to authenticate the identifier and/or PIN code and to grant or deny one-time access rights to the non-keyholder 101.

An embodiment of the invention also provides a handheld device 105 having a computer processor and a computer-readable memory coupled with the computer processor, wherein the computer-readable memory contains instructions that when executed by the computer processor cause at least one of the following types of data to be transmitted from the handheld device: a request for one-time access rights to an electronic locking device for a non-keyholder; an identifier and/or a PIN code associated with a non-keyholder; and an access code received from a server.

In an embodiment, the electronic lockbox 103 and/or the server 111 is configured to calculate how much time has elapsed since the electronic lockbox 103 opened, e.g., granted access, and to generate an alert signal/message if the elapsed time exceeds a predetermined threshold. In one embodiment, the alert is at least one of a flashing light and an audible sound emitted by an appropriately configured electronic lockbox 103. In an embodiment, the alert is data generated for storage on and/or re-routing by the server 111. In an embodiment, the alert is data generated for sensing, e.g., viewing, hearing, reading, etc. by an authorized user 109.

In an embodiment, the electronic lockbox 103 is configured to sense whether an item secured by the electronic lockbox 103 is replaced within a predetermined time threshold. In such an embodiment, the electronic lockbox 103 may be further configured to generate an alert when the item is not replaced within the predetermined time threshold. In such an embodiment, the electronic lockbox 103 is equipped with at least one sensor. Examples of sensors are, but are not limited to, a position sensor, a weight sensor, an RFID tag reader, and the like.

In an embodiment, a distress one-time access code, a distress identifier, or a distress PIN code, is generated for the authorized user 109 and/or the non-keyholder 101. For example, a distress code may be formed by adding an extra digit to a one-time access code, an identifier, or a PIN code. Alternatively, each of these types of distress codes is a standalone codes. In an embodiment, each of these types of distress codes is inputted into and/or received by the electronic locking device 103 and/or the handheld device 105 just as the one-time access code, identifier, and/or PIN code described above. In such an embodiment, the electronic locking device 103 and/or the server 111, however, are additionally configured to generate a silent alert upon receiving one of these distress codes, in addition to otherwise operating as described above. Depending on the embodiment, the silent alert is transmitted to a remote agent, e.g., a central dispatch center and/or one or more local emergency responders, e.g., police, fire, medical, etc.

In one embodiment, the electronic lockbox 103 receives and/or transmits data over one or more communications channels 155, 156, 127, 125. Examples of such communications channels include, but are not limited to, radio frequency and wired connection endpoints and bridges for standard mobile phone communication technologies, such as a global system for mobile communications (GSM), 3G mobile communication technology, code division multiple access (CDMA), and universal mobile telecommunications system (UMTS). Such communications channels 125, 155, 156 may also include an interface to receive satellite signals, local mobile transmitters, and other technologies via wireless fidelity (Wi-Fi) networks and wireless protocol utilizing short-range wireless communications technology facilitating data transmission over short distances from fixed and/or mobile devices.

Figure 11:
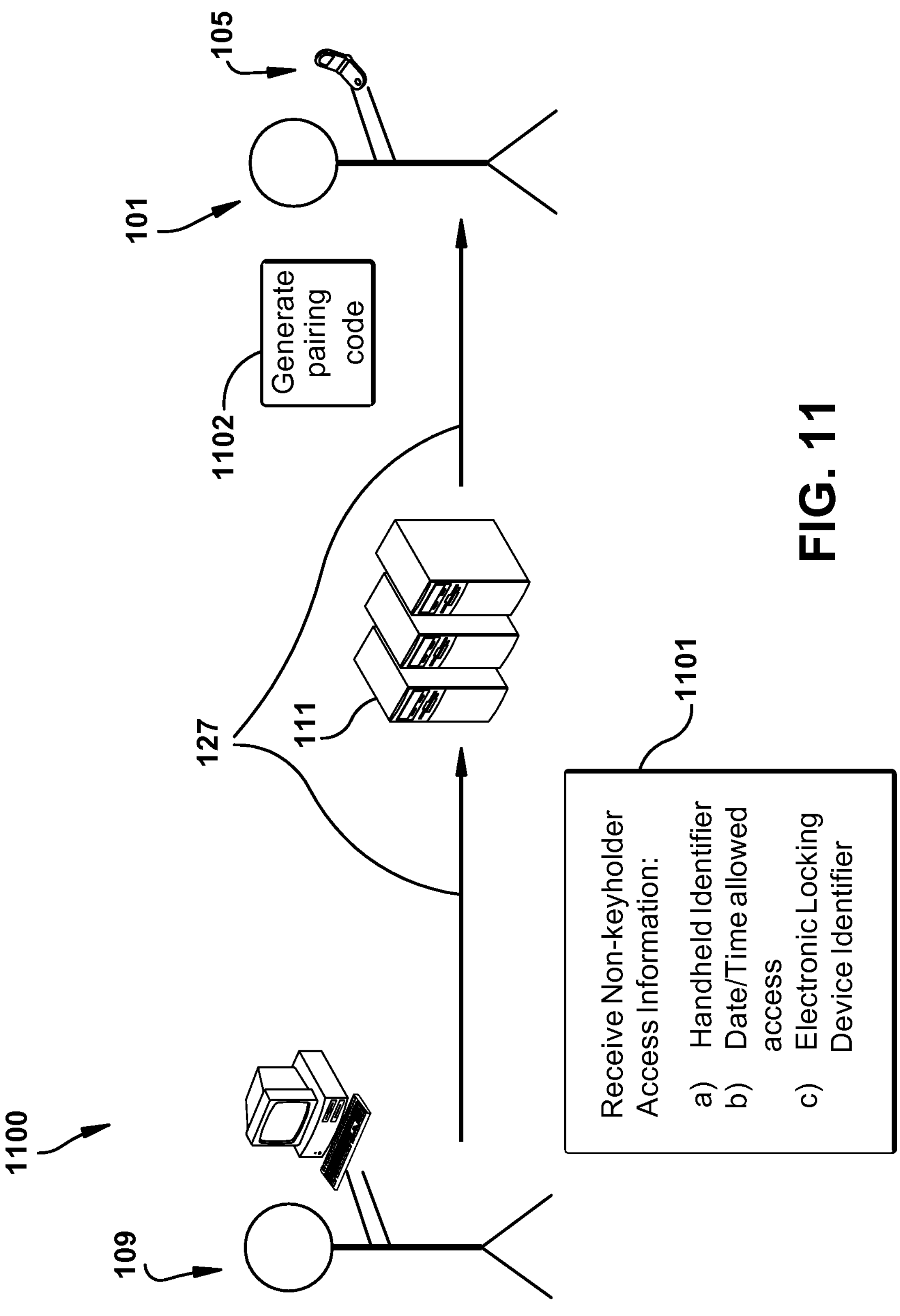
FIGS. 11 and 12 combined are a single diagram illustrating a method of providing one-time access rights for a non-keyholder.
Figure 12:
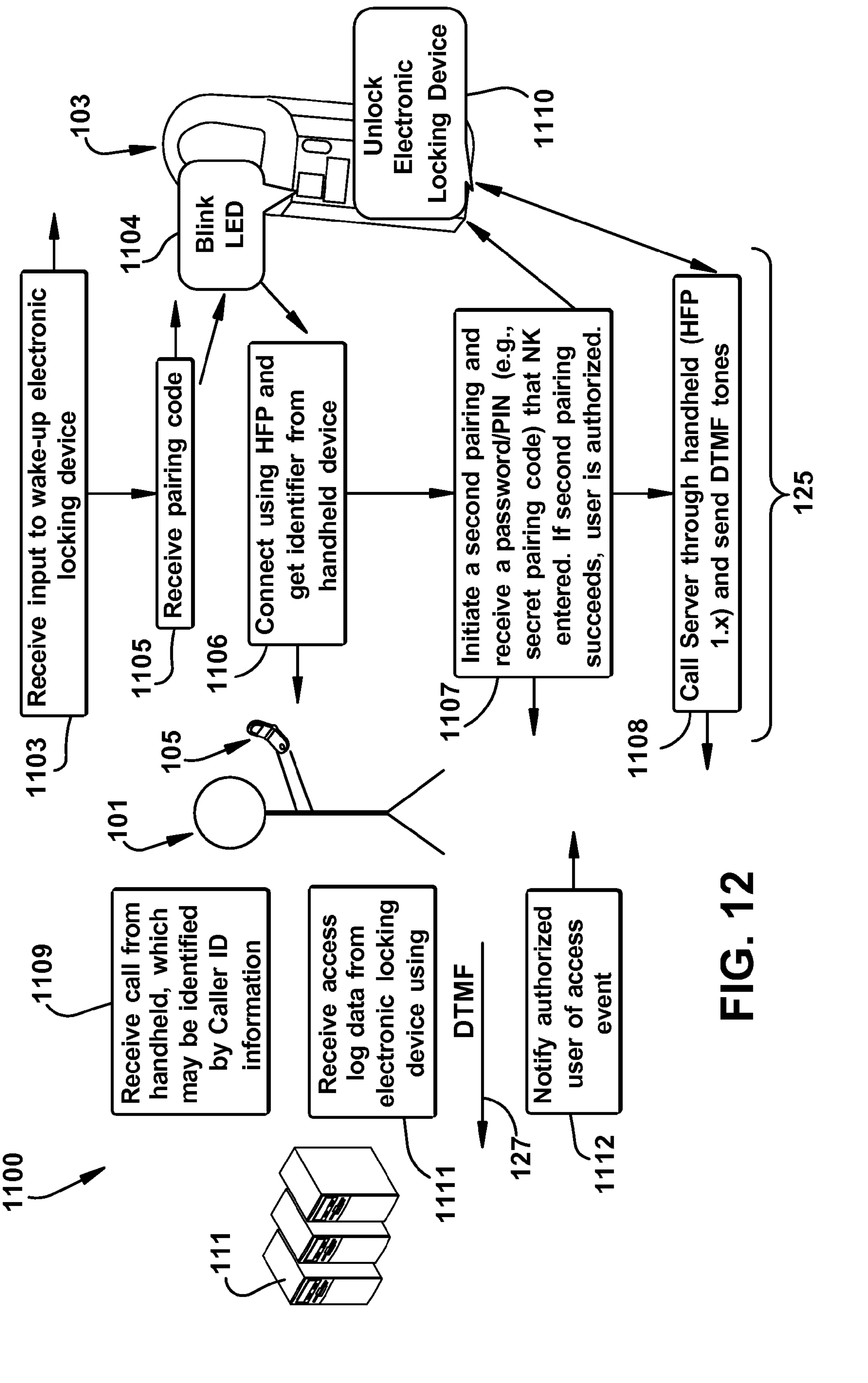

FIGS. 11 and 12 are diagrams of a method 1100 of using a short-range wireless communications network to pair an electronic locking device 103 with a handheld device 105. Various embodiments of the method 1100 include one or more of the actions represented by blocks 1101, 1102, 1103, 1104, 1105, 1106, 1107, 1108, 1109, 1110, and 1111 in any suitable order and/or combination. Each of these actions is performed by one or more computer processors.

In one embodiment, the method 1100 comprises receiving 1101 non-keyholder access information. As previously described, the non-keyholder access information comprises a handheld identifier, an electronic locking device identifier, and a date/time of allowed access. Using a long range wireless communications link 127, an authorized user 109 may input the non-keyholder access information into the server 111, which may be a data server and/or an IVR server. Depending on the embodiment, the non-keyholder access information is provided:

(a) verbally via a voice call to the authorized user 109 using handheld device 105;

(b) verbally via a voice call to the IVR server 111 using handheld device 105;

(c) electronically/audibly (e.g., DTMF tones) to either a computer of the authorized user 109 or the server 111 using the handheld device 105; or (d) any combination thereof.

After receiving the non-keyholder access information, the server 111 executes machine executable instructions that when executed cause the server 111 to generate at least one short-range wireless pairing code 1102*n* (for example, the default pairing code and the secret pairing code described above), which is transmitted to the handheld device 105 over long range wireless communications link 127. Alternatively, the short-range wireless pairing code 1102 is the first pairing code and/or the second pairing code described above, which is transmitted over the long-range wireless communications link 127 to the electronic locking device 103. Alternatively, the short-range wireless pairing code 1102 is transmitted of the long range wireless communications link 155 to another device, such as a dialer (128 in FIG. 9) installed on a property and linked to the electronic locking device 103 or to the handheld device 105 via a short-range wireless communication link 125 (FIG. 1).

Referring now to FIG. 12, the method 1100 comprises receiving 1103 an input to wake-up the electronic locking device 103, which may be configured to revert to a sleep mode after a pre-determined period of inactivity. The method 1100 comprises activating 1104 the electronic locking device 103 and/or blinking a LED on the electronic locking device 103. The method 1100 further comprises receiving 1105 the short-range wireless pairing code from the server 111, directly or indirectly; or from the handheld device 105, directly. In one example, the input to wake-up is received prior to receiving a BLUETOOTH™ pairing code. The input to wake-up can be physical (e.g., a button on the electronic locking device 103) or electronic (a signal sent from the handheld device 105 over the short-range wireless link).

The method 1100 also comprises connecting 1106 to the handheld device 105 and/or to the server 111 using a HFP on the handheld device 105, and obtaining a handheld identifier. The handheld identifier may be a phone number of the handheld device 105 and/or Caller ID information that corresponds to the phone number of the handheld device. Typically, the Caller ID information is available only if the handheld device is within coverage of a long-range wireless network.

If the handheld device 105 is out of coverage, the method 1100 may proceed directly to initiating 1107 a second pairing and receiving a password/PIN (e.g., a secret pairing code) that the non-keyholder 101 enters into the handheld device 105 or, in an alternate embodiment, into the electronic locking device 103. If the second pairing succeeds, e.g., is authenticated, the non-keyholder 101 is authorized access to the electronic locking device 103 and an access log entry is created and stored in a memory of the electronic locking device 103.

At this point, the method 1100 may comprise unlocking 1110 the electronic locking device 103, or calling 1108 the server 111 through the handheld device 105, using the HFP, and sending access log data as DTMF tones. The method 1100 may further comprise receiving 1109 a call from a handheld device 105, which may be, but is not required to be, identified by Caller ID information. The call may be a HFP call initiated by the electronic locking device 103, which is coupled with the handheld device 105 over a short-range wireless communication link 125 (FIG. 1).

The method 1100 may comprise receiving 1111 access log data from the electronic locking device using DTMF tones, or other means for transmitting data. Finally, the method 1100 may comprise notifying 1112 an authorized user 109 of an access event, based on receiving an access log created by the electronic locking device 103.

Figure 13A:
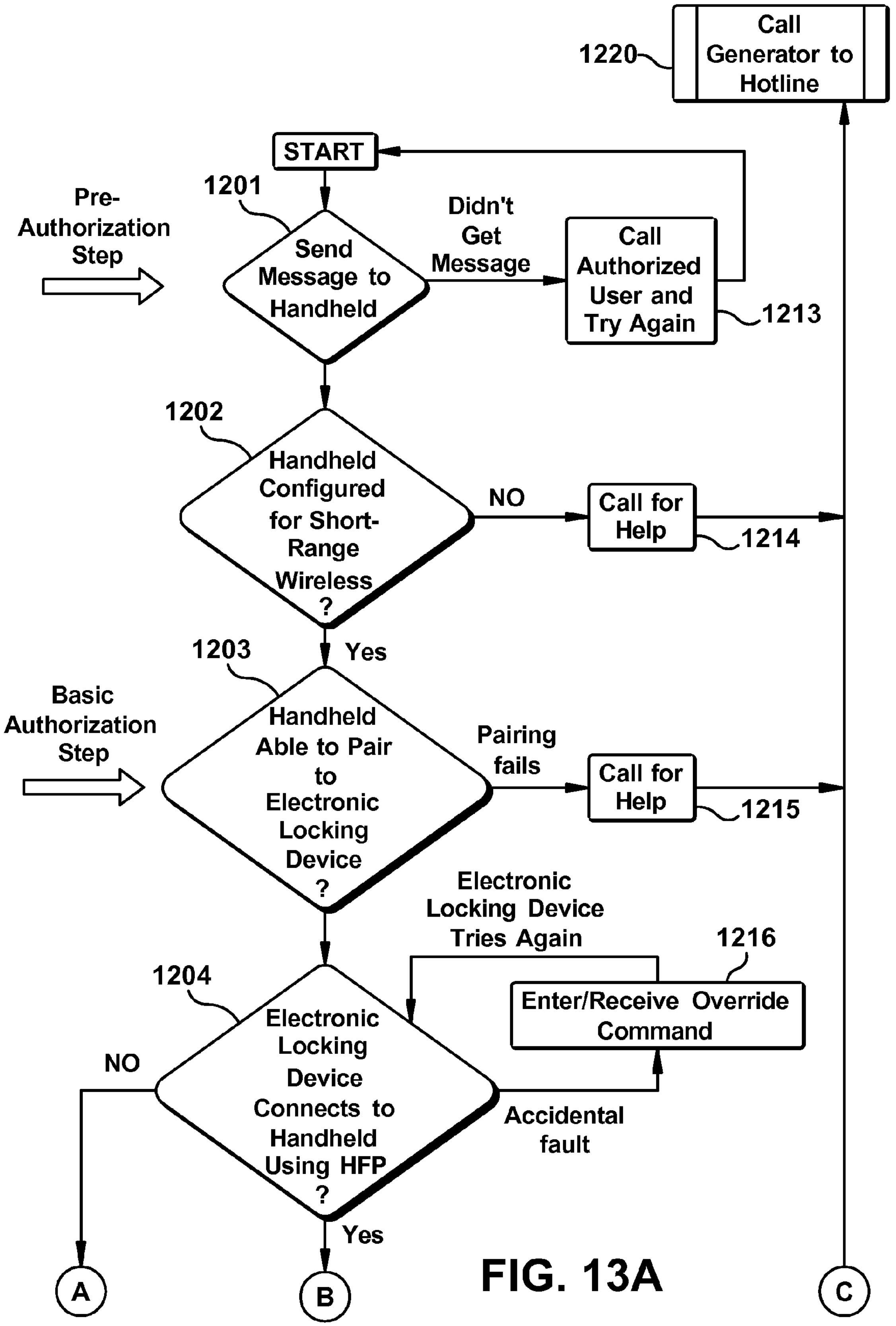
FIGS. 13*a* and 13*b* are a flowchart of an embodiment of a method of providing one-time access rights for a non-keyholder.
Figure 13B:
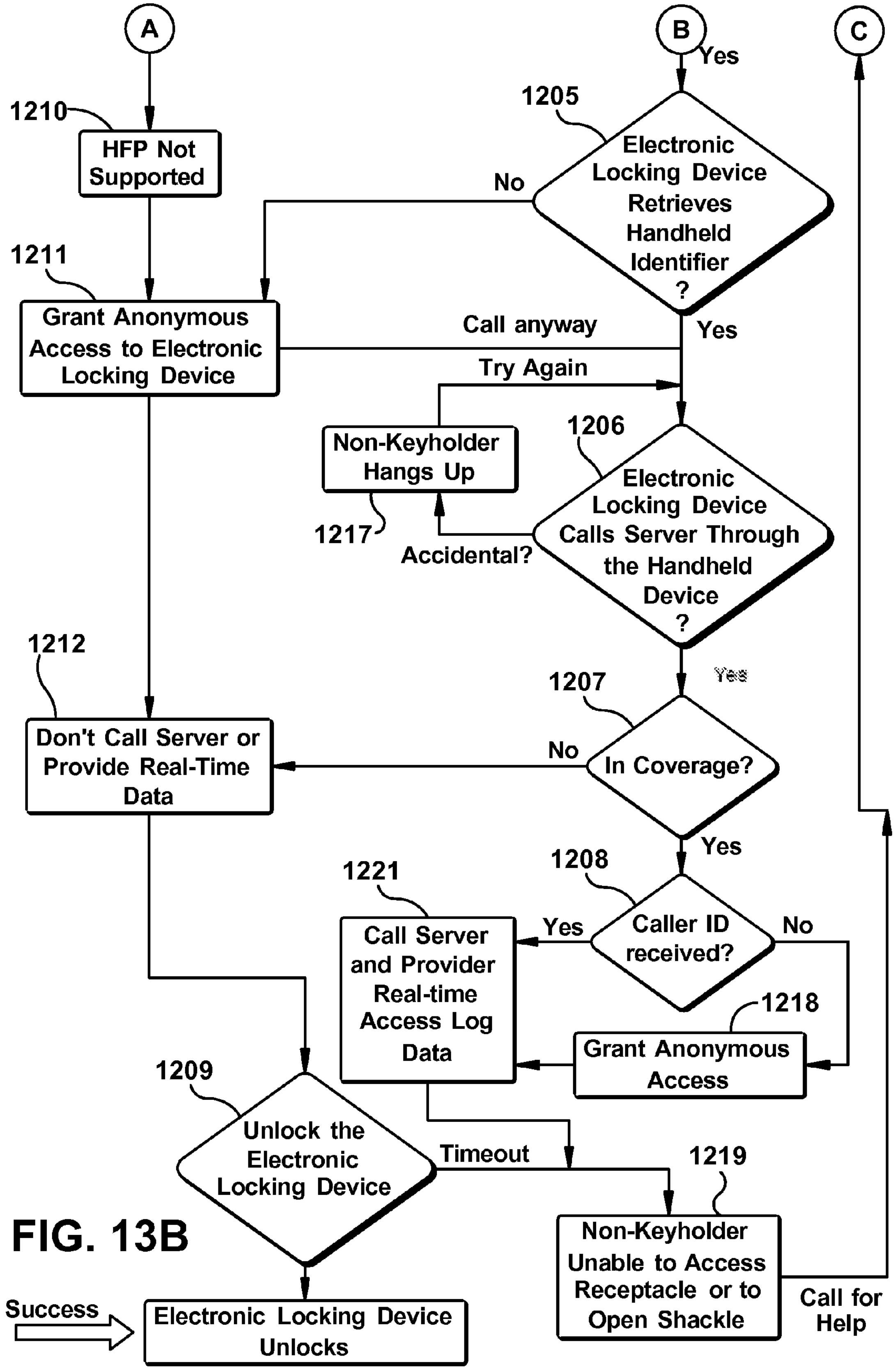

Turning now to FIGS. 13*a* and 13*b*, a flowchart illustrating an embodiment of a method 1200 of granting one-time access to an electronic locking device is shown. Various embodiments of the method 1200 comprise one or more of the actions represented by blocks 1201, 1202, 1203, 1204, 1205, 1206, 1207, 1208, 1209, 1210, 1211, 1212, 1213, 1214, 1215, 1216,

1217, 1218, 1219, 1220, and 1221 in any suitable order and/or combination. Each of these actions is performed by one or more computer processors.

Referring to FIGS. 1, 11, 13*a*, and 13*b*, at the block labeled "Start", it is assumed:

(a) that a non-keyholder 101 has a handheld device 105;

(b) that the non-keyholder 101 gave their access information to an authorized user 109 (or to the server 111);

(c) that the authorized user 109 or the server 111 has generated a one-time access code and transmitted a message containing the one-time access code to the handheld device 105. The message may optionally also include instructions for the non-keyholder 101 to follow.

Generally speaking, the method 1200 includes into several phases: pre-authorization, basic authorization, and user identification and real-time notification. In the pre-authorization phase, the method 1200 comprises sending 1201 a message to the handheld 105. If the message is not received, the method 1200 comprise calling 1213 the authorized user and trying again. If the message was successfully sent, the method 1200 comprises determining 1202 whether the handheld device 105 is configured for short-range wireless communication. If the handheld device 105 is not configured for short-range wireless communication it could be because the handheld device 105 does not have appropriate software and/or hardware; because the non-keyholder 101 does not know how to operate the software and/or hardware; or because the software and/or hardware has malfunctioned. In any of these scenarios, the method 1200 comprises calling 1214 for help.

If the handheld device 105 is configured for short-range wireless communication, the method 1200 enters the basic authorization phase. As represented by FIG. 13, this includes determining 1203 whether the handheld device 105 is able to pair with the electronic locking device 103 over the short-range wireless communication link 125. If the pairing fails, the method 1200 comprises calling 1215 for help.

If the pairing succeeds, the method 1200 comprises determining 1204 whether the electronic locking device 103 can connect to the server 111 using a HFP on the handheld device 105. If an accidental fault occurs during this determination, the method 1200 may comprise receiving 1216 an override command and trying again to connect to the server 111. If, as represented by block 1210, HFP is not supported, the method 1200 comprises granting 1211 anonymous access to the electronic locking device 103. As previously mentioned, an exemplary embodiment of the invention is configured to provide traceable identification of a non-keyholder. Accordingly, the granting 1211 anonymous access is an optional/configurable step.

Thereafter, when HFP is not supported, the method 1200 comprises not calling 1212 the server or providing real-time access data. Instead, the method 1200 comprises unlocking 1209 the electronic locking device 103.

The non-keyholder identification and real-time notification phase begins as the method transitions from block 1203 to block 1204. Referring to block 1204, if the electronic locking device 103 connects to the handheld device 105 using HFP, the method 1200 comprises retrieving 1205 the handheld identifier, or not. If the handheld identifier cannot be retrieved, the method 1200 performs the functions described above with respect to blocks 1211 and 1212 and 1209.

Otherwise, once the handheld identifier is retrieved the method 1200 comprises dialing 1206 the server 111 through the handheld device 105. If the user accidentally disrupted the dialing, the method 1200 comprises redialing the server 111. Otherwise, the method 1200 comprises determining 1207 whether the handheld device 105 is within coverage of a long-range wireless network. If not, the method 1200 performs the functions described above with respect to blocks 1212 and 1209.

Otherwise, if the handheld device 105 is within coverage, the method 1200 comprises receiving 1208 Caller ID information, based on the handheld identifier, or not. If Caller ID information is not available or cannot be received, the method 1200 comprises granting 1218 anonymous one-time access to the electronic locking device 103. If the Caller ID is received, or if anonymous access is granted at block 1218, the method 1200 further comprises calling 1221 the server 111, using the handheld device 105 and providing real-time access log data in the form of DTMF tones or other suitable means for transmitting data.

Thereafter, the method 1200 comprises unlocking 1209 the electronic locking device 103, or not. If the command to unlock the electronic locking device 103 times out, the non-keyholder 101 will be unable to unlock the electronic locking device 103 or to access its receptacle or to open its shackle. Accordingly, the method 1200 further comprises calling 1219 for help. The call for help can be initiated 1220 using call generator software on the handheld device 105 that configures the handheld device to dial a help hotline. If the command to unlock the electronic locking device 103 is received, the electronic locking device 103 unlocks.

Further details regarding the embodiments described above are provided as follows.

Unless otherwise indicated, each numbered block, or combination of numbered blocks, depicted in FIGS. 2-8 and 11-13*a*/13*b* are implemented by computer program instructions. These computer program instructions are loaded onto, or otherwise executable by, a computer or other programmable apparatus to produce a machine, and the instructions, which execute on the computer or other programmable apparatus create means or devices for implementing the functions specified. These computer program instructions may also be stored in a computer-readable memory that can direct a computer or other programmable apparatus to function in a particular manner, such that the instructions stored in the computer-readable memory produce an article of manufacture, including instruction means or devices which implement the functions specified. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified.

Embodiments of the invention provide one or more technical effects. One exemplary technical effect is the secure, traceable delivery of a non-keyholder's one-time access rights for an electronic locking device. As mentioned above, this significantly improves over prior systems and devices.

Examples of types of identifiers that can be used to track and/or verify an identity of a non-keyholder include, but are not limited to: an alphabetic identifier, a numeric identifier, an alphanumeric identifier, a biometric identifier (e.g., voiceprint, retinal scan, fingerprint, facial recognition, and the like), etc. Examples of an alphabetic identifier include, but are not limited to, a name of a person and/or a name of a company. Examples of a numeric identifier include, but are not limited to, a serial number, a phone number, a birthdate, a government issued identification number (or a portion thereof), an employee identification number (or a portion thereof) and so forth. Examples of an alphanumeric identifier include, but are not limited to, a government issued identification number (or a portion thereof), an employee identification number (or a portion thereof), and the like.

A non-limiting example of an "electronic locking device" is a real-estate lockbox configured to be removably secured to a portion of a building. Another non-limiting example of an "electronic locking device" is a vehicle lockbox configured to be removably secured to a portion of a vehicle. Non-limiting examples of vehicles include: automobiles, trucks, motorcycles, bicycles, boats, ships, marine vessels, personal watercraft, locomotives, railcars, spacecraft, aircraft, wheeled and/or tracked military vehicles, and so forth. Another non-limiting example of an "electronic locking device" is a keybox that is fixedly or removably secured to a portion of a structure. For example, a keybox containing keys to one or more vehicles in a private garage, a military motorpool, a rental fleet, a government fleet, or a corporate fleet may be removably or fixedly secured to a structure such as, but not limited to, a wall, a shelf, an item of furniture, an appliance, a door, a post, a kiosk, a safe, a robot, and the like. Another non-limiting example of an "electronic keybox" is a container containing one or more types of items that provide access to, and/or operation of, one or more access-controlled items and/or pieces of equipment. For example, such a container could contain: keys to one or more locks in an arms room; launch keys for space systems and/or weapons systems; and so forth.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the scope of the following claims.

What is claimed is:

1. A method, comprising:

receiving a request from a handheld device associated with a non-keyholder, the request being for one-time access rights for the non-keyholder to the electronic locking device, wherein the request includes access information, wherein the access information comprises data from which an electronic locking device identifier can be interred;

authenticating an identity of the non-keyholder; and transmitting to the handheld device an access application and a set of instructions, wherein the set of instructions is configured to cause the handheld device to perform operations comprising:

installing the access application on the handheld device; and executing the access application, wherein executing the access application causes the handheld device to transmit a one-time access code to the electronic locking device, wherein the one-time access code is configured to unlock the electronic locking device;

wherein the handheld device is configured to deliver the one-time access code to the electronic locking device over a short-range wireless communication link;

wherein the set of instructions and the access application are transmitted over a long-range wireless link to the electronic locking device and over the short-range wireless link from the electronic locking device to the handheld device.

2. The method of claim 1, wherein the electronic locking device is a real-estate lockbox.

3. The method of claim 1, further comprising:

receiving over a long-range wireless communication link an access log transferred from the electronic locking device to the handheld device over the short-range wireless communication link, wherein the access log comprises one or more access events; and notifying an authorized user of the electronic locking device of at least one of the one or more access events.

4. The method of claim 1, wherein the access information further comprises a handheld device identifier.

5. The method of claim 1, wherein the access information further comprises an identifier of the non-keyholder.

6. The method of claim 5, wherein the identifier of the non-keyholder comprises caller-id information.

7. A system, comprising:

a server;

a handheld device associated with a non-keyholder, wherein the handheld device is configured to communicate access information to the server over a long-range wireless communication link, wherein the access information comprises data from which an electronic locking device identifier can be inferred and an identifier from which an identity of the non-keyholder associated with the handheld device can be determined; and an electronic locking device configured to communicate with the handheld device over a short-range wireless communication link, wherein the electronic locking device is further configured to receive over the short-range wireless communication link an access code received from the handheld device over the short-range wireless link, wherein the server is configured to transmit a set of instructions and an access application over at least the long-range wireless link to the handheld device, wherein the set of instructions is configured to cause the handheld device to install the access application and execute the access application, wherein executing the access application causes the handheld device to send the access code to the electronic locking device to unlock the electronic locking device;

wherein the set of instructions and the access application are transmitted over the long-range wireless link to the electronic locking device and over the short-range wireless link from the electronic locking device to the handheld device.

8. The system of claim 7, wherein the electronic locking device is a real-estate lockbox.

9. The system of claim 7, wherein the access information further comprises a handheld device identifier.

10. The system of claim 7, wherein the identifier of the non-keyholder comprises caller-id information.

11. The method of claim 1, wherein executing the access application further causes the handheld device to perform the authenticating the identity of the non-keyholder.

12. The method of claim 1, wherein the access application is configured for one-time use.

* * * * *